(12) United States Patent
Yano

(10) Patent No.: US 9,092,883 B2
(45) Date of Patent: Jul. 28, 2015

(54) IMAGE PROCESSING DEVICE, IMAGE PROCESSING METHOD AND STORAGE MEDIUM STORING IMAGE PROCESSING PROGRAM

(71) Applicant: OLYMPUS CORPORATION, Shibuya-ku, Tokyo (JP)

(72) Inventor: Takahiro Yano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/288,119

(22) Filed: May 27, 2014

(65) Prior Publication Data

US 2014/0270518 A1 Sep. 18, 2014

Related U.S. Application Data

(63) Continuation of application No. PCT/JP2012/080484, filed on Nov. 26, 2012.

(30) Foreign Application Priority Data

Nov. 28, 2011 (JP) ................................. 2011-258714

(51) Int. Cl.
*G06K 9/00* (2006.01)
*G06T 5/50* (2006.01)
*H04N 5/232* (2006.01)
*H04N 9/07* (2006.01)
*G06T 11/60* (2006.01)

(52) U.S. Cl.
CPC . *G06T 5/50* (2013.01); *G06T 11/60* (2013.01); *H04N 5/232* (2013.01); *H04N 9/07* (2013.01); *H04N 2209/045* (2013.01)

(58) Field of Classification Search
CPC .......... G06K 9/00; G06T 3/4015; G06T 5/50; G06T 11/60; H04N 5/225; H04N 5/232; H04N 9/07; H04N 9/45; H04N 9/67; H04N 2101/00; H04N 2209/045
See application file for complete search history.

(56) References Cited

U.S. PATENT DOCUMENTS

| 7,903,155 B2 | 3/2011 | Sakurai et al. |
| 8,213,744 B2 * | 7/2012 | Yano .............................. 382/294 |
| 2010/0091131 A1 | 4/2010 | Furukawa |

FOREIGN PATENT DOCUMENTS

| JP | 2002-112007 A | 4/2002 |
| JP | 2006-157568 A | 6/2006 |
| JP | 2007-006021 A | 1/2007 |
| JP | 2007-133823 A | 5/2007 |
| JP | 2008-306651 A | 12/2008 |
| JP | 2010-015241 A | 1/2010 |

OTHER PUBLICATIONS

International Search Report (ISR) dated Dec. 25, 2012 (and English translation thereof) issued in International Application No. PCT/JP2012/080484.

* cited by examiner

*Primary Examiner* — Jose Couso
(74) *Attorney, Agent, or Firm* — Holtz, Holtz, Goodman & Chick PC

(57) ABSTRACT

Among a plurality of CFA images obtained by shooting the same subject, one image is a standard image, and another image is a reference image, and the displacement amount calculation portion calculates the displacement amount of the reference image with respect to the standard image. A synthesis processing portion performs a synthesis processing based on the displacement amount calculated by the displacement amount calculation portion, according to the pixel values of a standard image pixel and a reference image pixel that are corresponding pixels between the standard image and the reference image, so as to generate a combination CFA image. Here, when colors of the corresponding pixels differ between the standard image pixel and the reference image pixel, the synthesis processing portion generates, from the reference image, the pixel value of the same color as the color of the standard image pixel by interpolation processing, and performs the synthesis processing according to the pixel value generated by the interpolation processing and the pixel value of the standard image pixel.

6 Claims, 10 Drawing Sheets

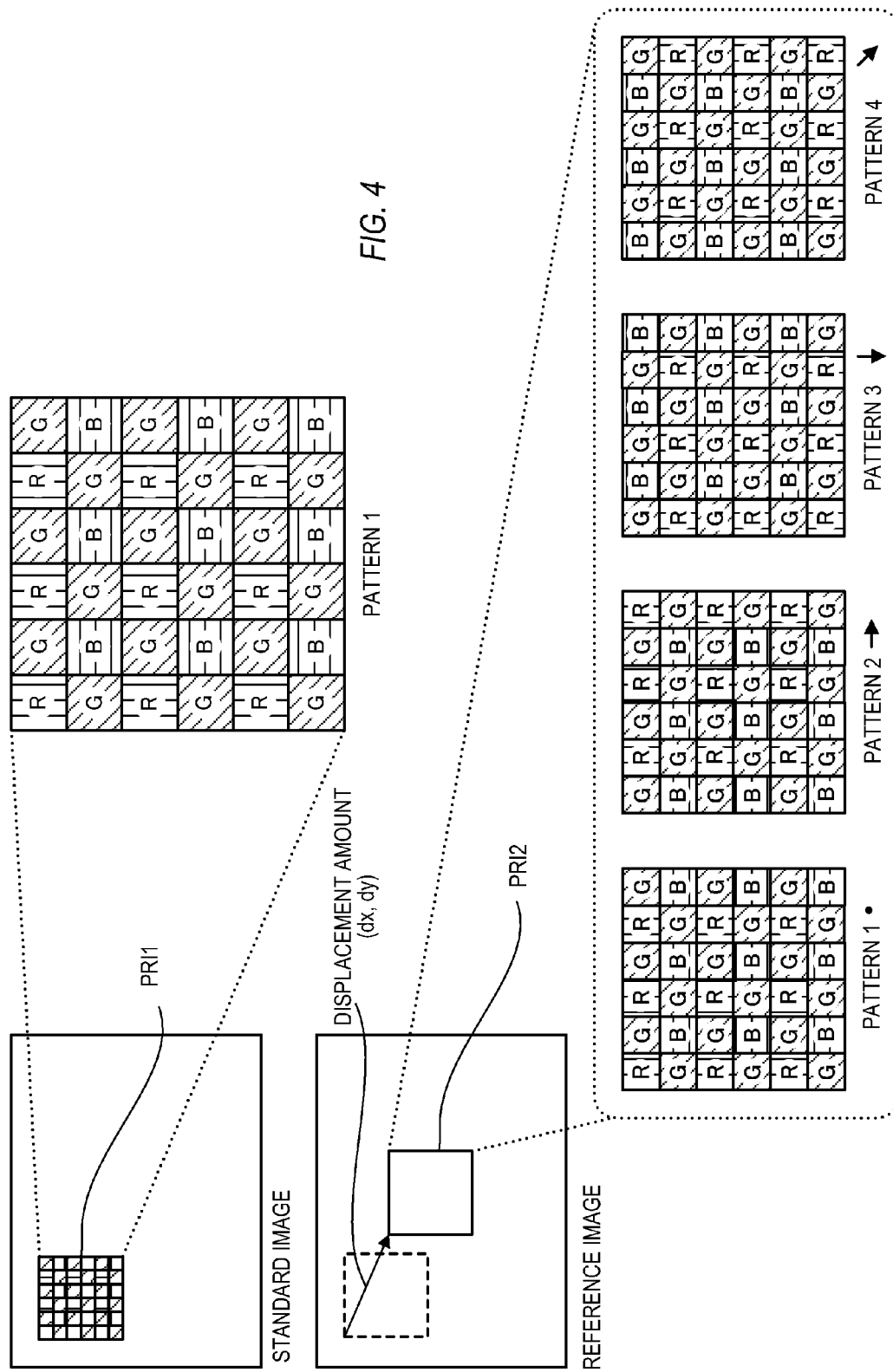

FIG. 5A

IMAGE PROCESSING DEVICE, IMAGE PROCESSING METHOD AND STORAGE MEDIUM STORING IMAGE PROCESSING PROGRAM

CROSS REFERENCE TO RELATED APPLICATIONS

This application is a continuation of International Patent Application No. PCT/JP2012/80484, filed on Nov. 26, 2012, which claims the benefit of Japanese Patent Application No. JP 2011-258714, filed on Nov. 28, 2011, which are incorporated by reference as if fully set forth.

TECHNICAL FIELD

The present invention relates to a technology for combining, without performing demosaicing processing, a plurality of color filter array images obtained by shooting the same subject with an image sensing element having on-chip color filters of a plurality of colors.

BACKGROUND ART

According to a known technology, a displacement amount is detected on a plurality of images obtained by shooting the same subject, and then the images are located based on the displacement amount and are combined, so that an image having a higher image quality than an image obtained by performing shooting one time is obtained.

As an image sensing device that can obtain a color image, there are a multi-plate type and a single-plate type. The image sensing device of the multi-plate type includes a color separation optical system such as a dichroic prism arranged behind a shooting optical system and a plurality of monochrome image sensing elements arranged on optical paths divided by the color separation optical system. The image sensing device of the single-plate type includes an image sensing element in which on-chip color filters of a plurality of colors, for example, RGB or YCM, that is, three colors, are aligned on a light reception surface. Since the image sensing device of the single-plate type may have only one image sensing element, and a dichroic prism or the like is not needed, the size and cost of the image sensing device are advantageously reduced.

Since an image that is read out from an image sensing element having on-chip color filters without being processed is called a color filter array image, and, from the color filter array image, it is impossible to obtain an image that can be viewed by a person, demosaicing processing is performed on the color filter array image, and thus an image called a demosaic image is generated. The demosaic image generates, for each of the pixels of the image, pixel values, for example, pixel values of R, G, B corresponding to the number of colors of the on-chip color filter. In other words, although in the color filter array image, only a certain single pixel value can be obtained from one pixel, in the demosaic image, for one pixel, the pixel values of a plurality of colors are included. In the example of R, G, B described above, the amount of information on the image is tripled by the demosaicing processing as compared with the amount of information on the image before the demosaicing processing.

JP2002-112007A discloses a method of performing demosaicing processing on a plurality of images and thereafter combining them. In the method disclosed in JP2002-112007A, the synthesis processing is performed by mainly utilizing the component of G color.

JP2006-157568A discloses a method of combining a plurality of color filter array images without performing demosaicing processing. Here, a displacement amount is detected between the color filter array images that are a target to be combined, and while the detected displacement is being compensated for, the images are added and are thereby combined.

SUMMARY OF INVENTION

According to an embodiment of the present invention, there is provided an image processing device that combines a plurality of color filter array images obtained by shooting a same subject. The image processing device comprises: a displacement amount calculation portion configured to calculate a displacement amount of a reference image with respect to a standard image, wherein among the color filter array images, one image is the standard image, and an image different from the one image is the reference image; and a synthesis processing portion configured to perform synthesis processing based on the displacement amount calculated by the displacement amount calculation portion, according to pixel values of a standard image pixel and a reference image pixel that are corresponding pixels at corresponding pixel positions between the standard image and the reference image, so as to generate a synthetic color filter array image. When colors of the corresponding pixels differ between the standard image pixel and the reference image pixel, the synthesis processing portion generates, from the reference image, a pixel value of a same color as a color of the standard image pixel by interpolation processing, and performs the synthesis processing according to the pixel value generated by the interpolation processing and the pixel value of the standard image pixel.

According to another embodiment to the present invention, there is provided an image processing method of combining a plurality of color filter array images obtained by shooting a same subject. The image processing method comprising: a displacement amount calculation step of calculating a displacement amount of a reference image with respect to a standard image, wherein among the color filter array images, one image is the standard image, and an image different from the one image is the reference image; and a synthesis step of performing synthesis processing based on the displacement amount calculated by the displacement amount calculation step, according to pixel values of a standard image pixel and a reference image pixel that are corresponding pixels at corresponding pixel positions between the standard image and the reference image, so as to generate a synthetic color filter array image. In the synthesis processing step, when colors of the corresponding pixels differ between the standard image pixel and the reference image pixel, a pixel value of a same color as a color of the standard image pixel is generated from the reference image by interpolation processing, and the synthesis processing is performed according to the pixel value generated by the interpolation processing and the pixel value of the standard image pixel.

According to further another embodiment of the present invention, there is provided a non-transitory computer readable storage medium that stores an image processing program of combining a plurality of color filter array images obtained by shooting a same subject. The image processing program controls a computer to execute: a displacement amount calculation step of calculating a displacement amount of a reference image with respect to a standard image, wherein among the color filter array images, one image is the standard image, and an image different from the one image is the reference image; and a synthesis processing step of performing synthesis processing based on the displacement amount calculated by the displacement amount calculation step, according to pixel values of a standard image pixel and a reference image pixel that are corresponding pixels at corresponding pixel positions between the standard image and the reference image, so as to generate a synthetic color filter array image. In the synthesis processing step, when colors of the corresponding pixels differ between the standard image pixel and the reference image pixel, a pixel value of a same color as a color of the standard image pixel is generated from the reference image by interpolation processing, and the synthesis processing is performed according to the pixel value generated by the interpolation processing and the pixel value of the standard image pixel.

The foregoing and additional features and characteristics of this disclosure will become more apparent from the following detailed description considered with the reference to the accompanying drawings.

BRIEF DESCRIPTION OF DRAWINGS

FIG. 4 is a diagram showing the arrangement pattern of pixel colors that can be taken in a partial region image of a reference image according to a result of the specification of, in the reference image, the position of the partial region image corresponding to the partial region image set in the standard image of the color filter array image;

FIG. 5A is a diagram illustrating interpolation processing performed when the pixel color arrangement pattern of the partial region image specified in the reference image corresponding to the partial region image set in the standard image is different from the pixel color arrangement pattern of the partial region image set in the standard image;

DESCRIPTION OF EMBODIMENTS

Figure 1:
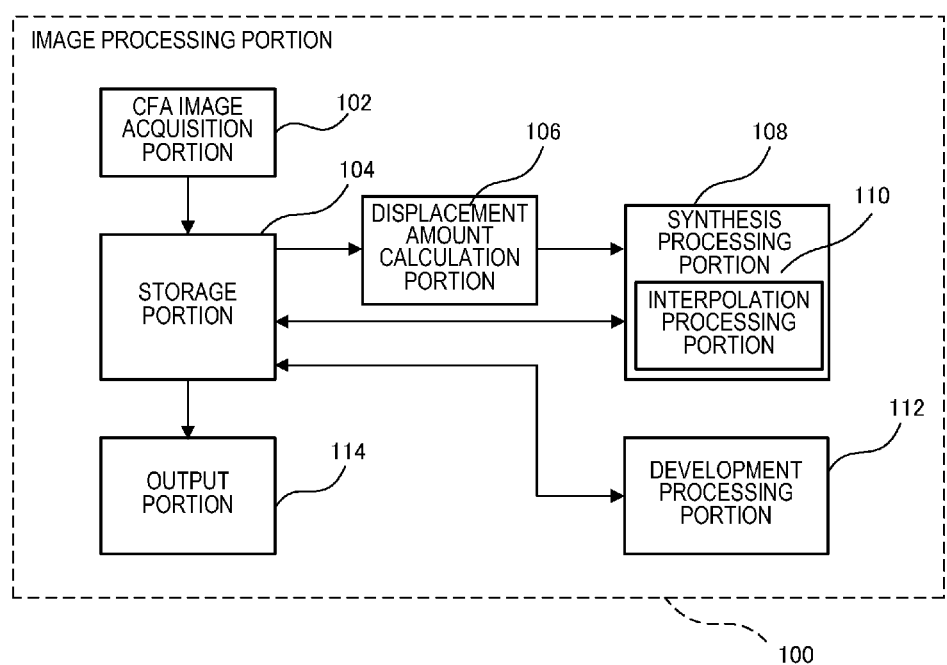
FIG. 1 is a block diagram illustrating the configuration of an image processing portion.

FIG. 1 is a block diagram illustrating the schematic configuration of an image processing portion. The image processing portion 100 includes a color filter array (CFA) image acquisition portion (hereinafter referred to as a CFA image acquisition portion) 102, a storage portion 104, a displacement amount calculation portion 106, a synthesis processing portion 108, a development processing portion 112 and an output portion 114.

The CFA image acquisition portion 102 acquires a plurality of CFA images obtained by shooting the same subject. The CFA images can be obtained by chronologically shooting the same subject in a relatively short period of time. Alternatively, the CFA images can be obtained by substantially simultaneously shooting the same subject with a plurality of image sensing units. When the CFA images are obtained with different exposure amounts, the CFA images are combined, and thus it is possible to obtain a so-called HDR (High Dynamic Range) image. By combining a plurality of CFA images, which are obtained under shooting conditions of low brightness with an exposure amount (short exposure time) slightly lower than a standard exposure amount determined by the brightness of the subject, the sensitivity of an image sensing element and the like, it is possible to obtain an image in which camera shake, subject shake and noise are reduced.

The storage portion 104 includes a memory, such as a SDRAM, that has a relatively high access speed, and temporarily stores the CFA images obtained by the CFA image acquisition portion 102. The storage portion 104 is also used as the work area of the synthesis processing portion 108.

The displacement amount calculation portion 106 assumes that one of a plurality of CFA images is a standard image and that the CFA images different from the standard image are reference images, and calculates the displacement amount of the reference images with respect to the standard image. As the method of calculating the displacement amount, various methods can be utilized. Although the standard image and the reference image may be compared with each other with assumption that the entire image is one region, to calculate the displacement amount, an example where a displacement amount is calculated for each partial region by block matching will be described below.

Figure 2:
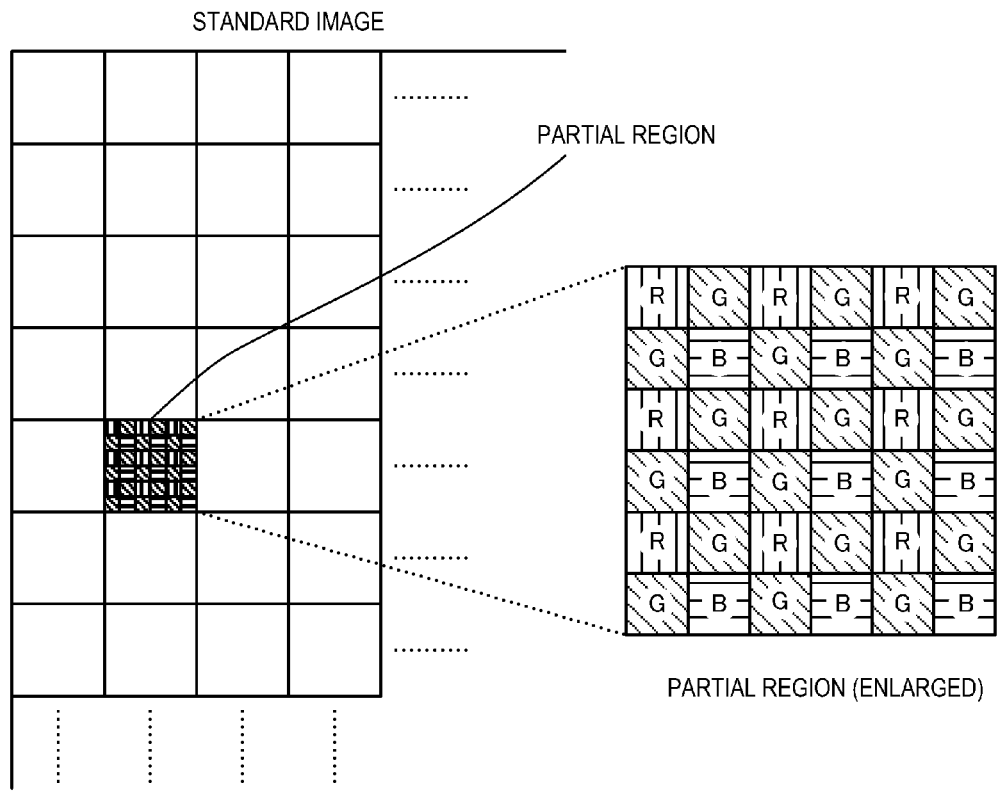
FIG. 2 is a diagram conceptually showing how one color filter array image of a plurality of color filter array images is selected as a standard image and partial regions for performing block matching in the standard image are sequentially set.

FIG. 2 shows an example of a partial region set within the standard image in the block matching. In FIG. 2, the partial region consisting of 36 pixels with 6 pixels in the vertical direction (column direction) and 6 pixels in the horizontal direction (row direction) is set as the example. In the present embodiment, it is also assumed that the CFA image is a so-called Bayer CFA image. In the Bayer CFA image, one pixel arrangement unit is formed by 4 pixels with 2 pixels in the vertical direction and 2 pixels in the horizontal direction.

When the block matching is performed in the CFA image, the displacement amount calculation portion 106 uses, as a template, the image of a partial region selected in the standard image, searches the reference image and derives the position of the partial region image where the degree of matching is the maximum (the degree of difference is the minimum). In the present example, in partial images of both the standard image and the reference image to be compared, the absolute difference or the square difference between pixel values at the corresponding pixel position is determined for each pixel position, and the sum of the absolute difference or the square difference is assumed to be the degree of difference. In other words, when the value of the sum is minimized, the degree of matching is maximized (the degree of difference is minimized).

Here, since in the CFA image, one pixel has only color information on one color, the image of a partial region having the same arrangement pattern of the same pixel colors as the partial region of the standard image is extracted from the reference image and both of the partial regions from the standard and reference image are compared. In other words, in the example shown in FIG. 2, the pixel colors of the image of the partial region selected from the standard image are arranged such that in odd-numbered rows as counted from the top row, colors of R, G, R, G, . . . are arranged, and that in even-numbered rows, colors of G, B, G, B, . . . are arranged. Accordingly, the pixel colors of the partial region selected in the reference image are also arranged in the same manner as described above. This is because, if not, the pixel value differs depending on the color of the pixel with which the brightness and color of one point on the subject are detected, and thus there may not be a proper correlation between the two images to be compared. Consequently, the accuracy (the minimum unit) of the displacement amount detected in the block matching depends on the arrangement unit of the pixel colors of the CFA image. In the present example, since the arrangement unit of the pixel colors consisting of 2 pixels in the vertical direction and 2 pixels in the horizontal direction is used, the displacement amount is detected with the accuracy of 2 pixels in each of the vertical direction (column direction) and the horizontal direction (row direction) of the image.

A description using generalized expressions will be given below. When in the arrangement unit of the pixel colors of the CFA image, r pixels in the vertical direction and c pixels in the horizontal direction (r and c each are arbitrary positive integers) are present, the minimum unit of the displacement amount detected is r pixels in the vertical direction and c pixels in the horizontal direction. In other words, as the arrangement unit of the pixel colors of the CFA image is made larger (the number of colors is increased), the minimum unit of the displacement amount detected is increased.

Figure 3:
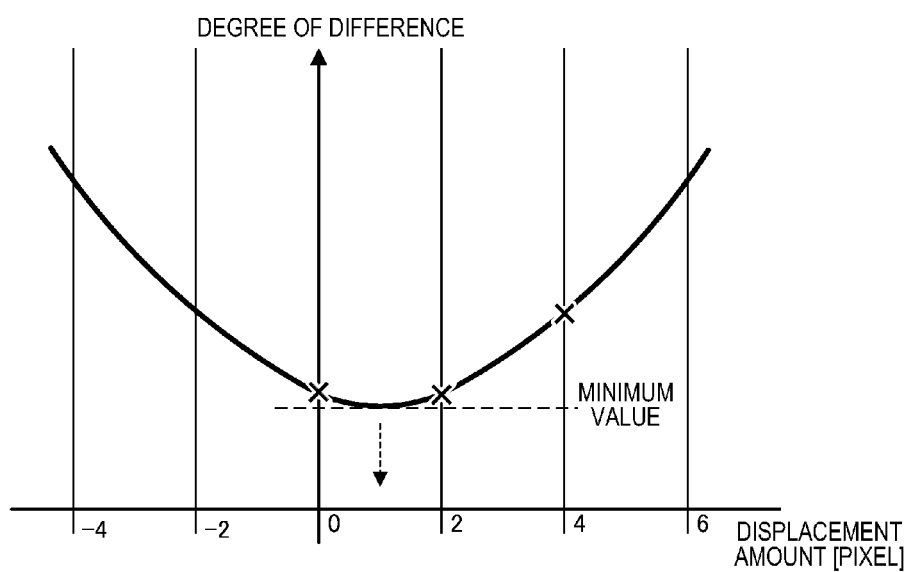
FIG. 3 is a diagram illustrating a method of sub-pixel position estimation, and a diagram conceptually showing an example where position estimation is performed by parabola fitting.

In order to determine the displacement amount with an accuracy higher than the pixel color arrangement unit (r pixels vertically and c pixels horizontally) of the CFA image, the displacement amount calculation portion 106 performs sub-pixel position estimation. As a method of performing the sub-pixel position estimation, there are isometric linear fitting, parabola fitting and the like. FIG. 3 shows an example of the sub-pixel estimation using parabola fitting. In FIG. 3, the horizontal axis is the displacement amount (unit: pixel) and the vertical axis is the degree of difference, where the degrees of difference are obtained and plotted by performing calculation while the position of the partial region in the reference image is being displaced. Here, an example where the degree of difference is determined while the image is being displaced in leftward and rightward directions will be described below. The displacement amount is assumed to be 0 [pixel] when the partial region images of both the standard image and the reference image are overlaid without their positions being displaced. When with the standard image fixed, the partial region image of the reference image is displaced from the above state in the leftward direction by 2 pixels, the displacement amount is assumed to be −2 [pixel]. On the other hand, when the reference image is displaced in the rightward direction by 2 pixels, the displacement amount is assumed to be 2 [pixel].

As described above, while the position is being displaced, the difference of the pixel values is determined, for each pixel position, between the pixels at the same pixel position of the standard image and the reference image, and the sum of the absolute values of the differences or the sum of the squares (the sum of the squares of the differences determined for individual pixel positions) is determined. The degree of difference is a value that corresponds to the magnitude of the sum of the absolute values or the sum of the squares. First, among the degrees of difference determined as described above, the displacement amount in the minimum degree of difference (the displacement amount indicating that the degree of difference is the minimum value) is determined. In the example of FIG. 3, the displacement amount in the minimum degree of difference is +2 pixels. Then, the formula of a parabola is determined that passes through three degrees of difference which are the degree of difference of the displacement amount in the minimum degree of difference and the degrees of difference of the displacement amounts on the left and right thereof. The bottom of the parabola is determined from the formula, and it is possible to determine the coordinates of the bottom as the displacement amount subjected to sub-pixel estimation when the degree of difference is minimized. In the present example, since the displacement amount is preferably determined in units (resolution) of one pixel, the displacement amount obtained by the sub-pixel position estimation is, for example, rounded off to an integer.

The above-described calculation of the displacement by the displacement amount calculation portion 106 is performed in each of the up/down direction and the left/right direction of the image. Thus, the displacement amount is calculated by the resolution of one pixel regardless of the number of pixels (in the Bayer CFA image, 2 pixels for each of the vertical and horizontal directions) vertically and horizontally forming the arrangement unit of the pixel colors of the CFA image.

The information (displacement amount information) on the displacement amount in the vertical and horizontal directions calculated by the displacement amount calculation portion 106 is output to the synthesis processing portion 108. Based on the displacement amount information, the synthesis processing portion 108 performs processing that combines the standard image and the reference image to generate a synthetic image.

FIG. 4 is a diagram showing a relationship of the arrangement of pixel colors between an image PRI1 in a partial region set in the standard image and an image PRI2 in a partial region specified in the reference image based on the displacement amount calculated by the displacement amount calculation portion 106. In the following description, the image in the partial region set in the standard image is referred to as a partial region image PRI1, and the image in the partial region specified in the reference image is referred to as a partial region image PRI2. Here, it is assumed that the displacement amount in the horizontal direction calculated by the displacement amount calculation portion 106 is dx, and the displacement amount in the vertical direction is dy. The partial region set in the standard image at the time of the synthesis processing may be the same as or different from the partial region set when the displacement amount is calculated by the displacement amount calculation portion 106. In the present example, the image in the partial region set in the standard image by the displacement amount calculation portion 106 is assumed to be the same as the partial region image PRI1.

As described previously, the displacement amounts dx and dy are determined with the resolution of one pixel by the displacement amount calculation portion 106, with the result that the values of the displacement amounts dx and dy can be positive and negative integers including 0. When the partial region image PRI1 and the partial region image PRI2 are compared in pixel units, the pixel colors may be the same as or different from each other depending on the values of the displacement amounts dx and dy. In the present example, the CFA image has the arrangement unit consisting of 2 pixels in each of the vertical and horizontal directions. Hence, depending on the combination of the displacement amounts dx and dy determined by an even number (where 0 is an even number) and an odd number, that is, any one of the four combinations of the combination (dx, dy), (even number, even number), (even number, odd number), (odd number, even number) and (odd number, odd number), the pixel colors at the corresponding pixel positions between the partial region images PRI1 and PRI2 may be the same as or different from each other.

A description using generalized expressions will be given about what has been discussed above. It is assumed that the arrangement unit of the pixel colors of the CFA image consists of r pixels in the vertical direction and c pixels in the horizontal direction (r and c each are arbitrary positive integers). Depending on the combination of a remainder when the displacement amount (displacement pixel number) in the horizontal direction dx (integer value) is divided by the integer c and a remainder when the displacement amount (displacement pixel number) in the vertical direction dy (integer value) is divided by the integer r, the pixel colors at the corresponding pixel positions between the partial region images PRI1 and PRI2 are the same as or different from each other. For example, when the arrangement unit of the pixel colors of the CFA image consists of 2 pixels in each of the vertical and horizontal directions, the remainders determined with regard to the vertical and horizontal directions are two values that are 0 and 1. Hence, four patterns are produced according to the combination of the remainders in the vertical and horizontal directions. When the arrangement unit of the pixel colors of the CFA image consists of 3 pixels in the vertical and horizontal directions, the remainders determined with regard to the vertical and horizontal directions are three values that are 0, 1 and 2. Hence, nine patterns are produced according to the combination of the remainders in the vertical and horizontal directions.

FIG. 4 shows that, in the present embodiment, the four patterns that can be produced as the arrangement of the pixel colors of the partial region image PRI2 are shown as pattern 1, pattern 2, pattern 3 and pattern 4. The pattern of the partial region image PRI1 in the standard image is assumed to be the pattern 1.

The pattern 1 corresponds to a case where the displacement amounts dx and dy each are even numbers (the remainders obtained by dividing dx by the integer c and dividing dy by the integer r are each 0), and the pixel colors at the corresponding pixel positions of the image of the partial region image PRI1 and the partial region image PRI2 are the same as each other.

Pattern 2 corresponds to a case where the displacement amount dx is an odd number and the displacement amount dy is an even number (the remainder obtained by dividing dx by the integer c is 1, and the remainder obtained by dividing dy by the integer r is 0), and is a pattern in which the arrangement of the pixel colors is displaced by one pixel in the horizontal direction with respect to the arrangement of the pattern 1. When the arrangement of the pixel colors of the partial region image PIR2 is the pattern 2, the pixel colors at the corresponding pixel positions of the partial region image PRI1 and the partial region image PRI2 are completely different from each other.

The pattern 3 corresponds to a case where the displacement amount dx is an even number and the displacement amount dy is an odd number (the remainder obtained by dividing dx by the integer c is 0, and the remainder obtained by dividing dy by the integer r is 1), and is a pattern in which the arrangement of the pixel colors is displaced by one pixel in the vertical direction with respect to the arrangement of the pattern 1. When the arrangement of the pixel colors of the partial region image PRI2 is the pattern 3, the pixel colors at the corresponding pixel positions of the partial region image PRI1 and the partial region image PRI2 are completely different from each other.

The pattern 4 corresponds to a case where the displacement amounts dx and dy each are odd numbers (the remainders obtained by dividing dx by the integer c and dividing dy by the integer r are each 1), and is a pattern in which the arrangement of the pixel colors is displaced by one pixel in each of the vertical and horizontal directions with respect to the arrangement of the pattern 1. When the arrangement of the pixel colors of the partial region image PIR2 is the pattern 4, the pixel colors at the corresponding pixel positions of the partial region image PRI1 and the partial region image PRI2 are the same as each other only in the pixels of G color.

When the partial region images PRI1 and PRI2 are combined in the pixels at the corresponding pixel positions, it is possible to satisfactorily perform the combination if the pixel colors are the same. However, if the pixel colors are different, it is impossible to obtain the appropriate results of the combination by simply combining the pixel values of different colors. In order to obtain the appropriate results of the combination, an interpolation processing portion 110 within the synthesis processing portion 108 performs interpolation processing that will be described below. By this interpolation processing, an image (interpolation image) having the same arrangement as that of the pixel colors of the partial region image PRI1 is generated from the partial region image PRI2.

Figure 5A:
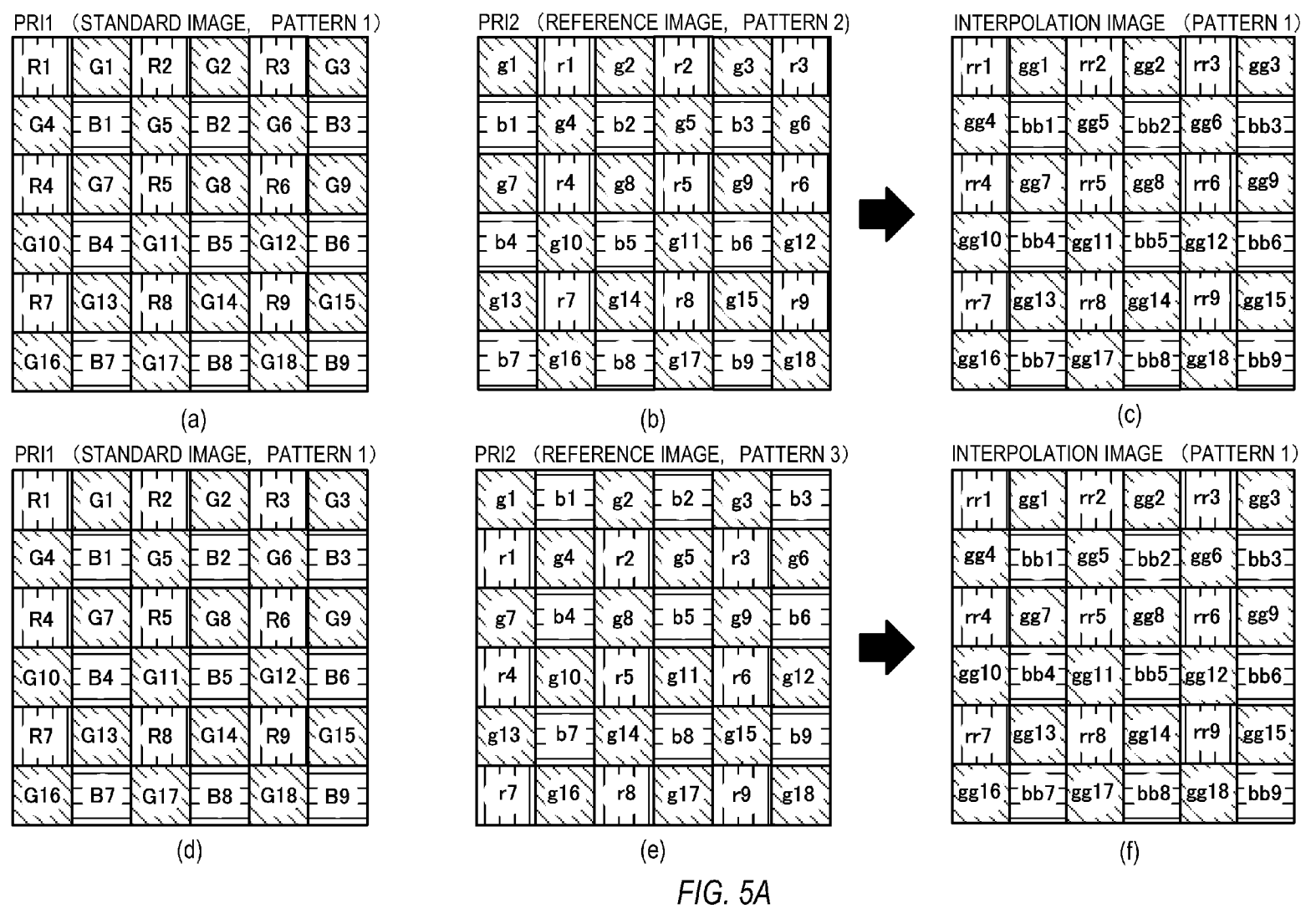
Figure 5B:
FIG. 5B is another diagram illustrating interpolation processing performed when the pixel color arrangement pattern of the partial region image specified in the reference image corresponding to the partial region image set in the standard image is different from the pixel color arrangement pattern of the partial region image set in the standard image.

FIGS. 5A and 5B are diagrams illustrating how when in the partial region image PRI1 set in the standard image and the partial region image PRI2 in the reference image, the pixel color arrangement patterns of the pixels of these partial region images are different, an interpolation image is generated by interpolation processing corresponding to such difference. (a), (d) and (h) in FIGS. 5A and 5B show examples of the pixel color arrangement pattern of the pixels of the partial region image PRI1 in the standard image. The patterns illustrated in (a), (d) and (h) are the same as each other, and are here assumed to be the pattern 1, which is previously illustrated with reference to FIG. 4. In (a), (d) and (h), the pixels of the colors of R, G and B are distinguished by adding alphabetical letters R, G and B indicating the colors and the subsequent numbers thereto. (b), (e) and (i) show pixel color arrangement patterns of the pixels of the partial region image PRI2 in the reference image. The patterns illustrated in (b), (e) and (i) are different from pattern 1, and are shown so as to have the patterns 2, 3 and 4, which are previously described with reference to FIG. 4. In (b), (e) and (i), the pixels of the colors of R, G and B are distinguished by adding alphabetical letters r, g and b indicating the colors and the subsequent numbers thereto. (c), (f) and (j) show how interpolation processing described below is performed by the interpolation processing portion 110 on the partial region image PRI2 of the pixel color arrangement patterns 2, 3 and 4 shown in (b), (e) and (i), and thus an interpolation image having the pixel color arrangement pattern of the pattern 1 is generated. In (c), (f) and (j), the pixels of the colors of R, G and B are distinguished by adding alphabetical letters rr, gg and bb indicating the colors and the subsequent numbers thereto.

With reference to (a), (b) and (c) in FIG. 5A, an example where the interpolation image is generated from the partial region image PRI2 having the pixel color arrangement pattern of the pattern 2 will be described. When the interpolation processing is performed on the partial region image PRI2 having the pixel color arrangement pattern of the pattern 2 illustrated in (b) of FIG. 5A, for example, the pixel value of a pixel rr1 of R color in the interpolation image is generated at the pixel position of a pixel g1 of G color. Likewise, the pixel value of a pixel gg1 of G color in the interpolation image is generated at the pixel position of a pixel r1 of R color. A specific example of the interpolation processing corresponding to the pixel color arrangement pattern of the pattern 2 will be described below.

Here, an example will be described with regard to a case where in the pixel color arrangement pattern corresponding to the Bayer arrangement, the pixel values of pixels rr5, gg8, gg11 and bb5 forming a pixel color arrangement unit are generated by interpolation processing. The interpolation processing described below is repeatedly performed on the other arrangement units in the reference image, and thus it is possible to generate the interpolation image.

As examples of the processing performed by the interpolation processing portion 110, two types of interpolation methods will be described below. In the following discussion, these interpolation methods are referred to as interpolation method 1 and interpolation method 2, and a description will be given. In the interpolation method 1, relatively simple linear interpolation is used, and it is possible to increase the speed of the processing. The interpolation method 2 is a higher interpolation method with reference to the height of a correlation between a plurality of pixels present in the vicinity of the pixel to be interpolated, and it is possible to reduce the decrease in the sharpness of the image.

[Pattern 2, Interpolation Method 1]

With reference to (c) of FIG. 5A, an example will be described where in the partial region image generated by the interpolation processing, the pixel value of a pixel rr5 located in the third row from the top and the third column from the left is generated by linear interpolation. In the partial region image PRI2 in the reference image shown in (b) of FIG. 5A, a pixel g8 is located in the third row and the third column, and it is impossible to use the pixel value of the pixel g8 itself as the pixel value of the pixel rr5. Hence, the average value of the pixel values of pixels r4 and r5 of R color located on the left and right of the pixel g8 is set at the pixel value of the pixel rr5. In other words, the pixel value of the pixel rr5 is determined by the following formula (1-1a).

$$rr5=(r4+r5)/2 \qquad \text{formula (1-1a)}$$

With reference to (c) of FIG. 5A, an example will be described where in the partial region image generated by the interpolation processing, the pixel value of a pixel gg8 located in the third row from the top and the fourth column from the left is generated by linear interpolation. In the partial region image PRI2 in the reference image shown in (b) of FIG. 5A, a pixel r5 is located in the third row and the fourth column, and it is impossible to use the pixel value of the pixel r5 itself as the pixel value of the pixel gg8. Hence, the average value of the pixel values of pixels g5, g11, g8 and g9 of G color located on the top, bottom, left and right of the pixel r5 is set at the pixel value of the pixel gg8. In other words, the pixel value of the pixel gg8 is determined by the following formula (1-1b).

$$gg8=(g5+g11+g8+g9)/4 \qquad \text{formula (1-1b)}$$

With reference to (c) of FIG. 5A, an example will be described where in the partial region image generated by the interpolation processing, the pixel value of a pixel gg11 located in the fourth row from the top and the third column from the left is generated by linear interpolation. In the partial region image in the reference image shown in (b) of FIG. 5A, a pixel b5 is located in the fourth row and the third column, and it is impossible to use the pixel value of the pixel b5 itself as the pixel value of the pixel gg11. Hence, the average value of the pixel values of pixels g8, g14, g10 and g11 of G color located on the top, bottom, left and right of the pixel b5 is set at the pixel value of the pixel gg11. In other words, the pixel value of the pixel gg11 is determined by the following formula (1-1c).

$$gg11=(g8+g14+g10+g11)/4 \qquad \text{formula (1-1c)}$$

With reference to (c) of FIG. 5A, an example will be described where in the partial region image generated by the interpolation processing, an image bb5 located in the fourth row from the top and the fourth column from the left is generated by linear interpolation. In the partial region image PRI2 in the reference image shown in (b) of FIG. 5A, a pixel g11 is located in the fourth row and the fourth column, and it is impossible to use the pixel value of the pixel g11 itself as the pixel value of the pixel bb5. Hence, the average value of the pixel values of pixels b5 and b6 of B color located on the left and right of the pixel g11 is set at the pixel value of the pixel bb5. In other words, the pixel value of the pixel bb5 is determined by the following formula (1-1d).

$$bb5=(b5+b6)/2 \qquad \text{formula (1-1d)}$$

As described above, according to the interpolation method 1, it is possible to generate the pixel values of the interpolation image by the relatively simple calculation.

[Pattern 2, Interpolation Method 2]

With reference to (c) of FIG. 5A, an example will be described where in the partial region image generated by the interpolation processing, the pixel value of a pixel rr5 located in the third row from the top and the third column from the left is generated. In the present example, using the pixel values of a pixel g8 located in the third row and the third column shown in (b) of FIG. 5A and the pixels located in the vicinity of the pixel g8 in the partial region image PRI2 in the reference image, the pixel value of the pixel rr5 is determined by the following formula (1-2a).

$$rr5=[\{r4-(g4+g7+g8+g10)/4\}+\{r5-(g5+g8+g9+g11)/4\}]/2+g8 \qquad \text{formula (1-2a)}$$

The pixel r4 and the pixel r5 are pixels that are located on the left and right of the pixel g8. The pixels g4, g10, g7 and g8 are pixels that are located on the top, bottom, left and right of the pixel r4, and the pixels g5, g11, g8 and g9 are pixels that are located on the top, bottom, left and right of the pixel r5. Specifically, $\{r4-(g4+g7+g8+g10)/4\}$ in the right-hand side of the above formula determines a difference between the pixel value (that is, the value of R color) of the pixel r4 and the estimation value (the average value of pixels g4, g7, g8 and g10) of G color at the position of the pixel r4, that is, a color difference (R-G color difference) between R color and G color at the position of the pixel r4. Likewise, $\{r5-(g5+g8+g9+g11)/4\}$ determines a difference between the pixel value (that is, the value of R color) of the pixel r5 and the estimation value (the average value of pixels g5, g8, g9 and g11) of G color at the position of the pixel r5, that is, an R-G color difference at the position of the pixel r5.

When the average value of the R-G color differences at the positions of the pixel r4 and the pixel r5 is determined, it is possible to utilize it as the estimation value of the R-G color difference at the position of the pixel g8. The average value of this R-G color difference is added to the pixel value of the pixel g8, and thus it is possible to more accurately estimate the pixel value of R color at the position of the pixel g8.

With reference to (c) of FIG. 5A, an example will be described where in the partial region image generated by the interpolation processing, the pixel value of the pixel gg8 located in the third row from the top and the fourth column from the left is generated by higher interpolation. In this case, using the pixel values of the pixel r5 located in the third row and the fourth column in the partial region image PRI2 in the reference image shown in (b) of FIG. 5A and the pixels located on the top, bottom, left and right of the pixel r5, the pixel value of the pixel gg8 is determined by the following formula (1-2b) or formula (1-2c).

When |g5−g11|<|g8−g9|, $$gg8=(g5+g11)/2+(-r2+2*r5-r8)*\lambda \quad \text{formula (1-2b)}$$

When |g5−g11|≥|g8−g9|, $$gg8=(g8+g9)/2+(-r4+2*r5-r6)*\lambda \quad \text{formula (1-2c)}$$

Here, the satisfaction of the conditional formula |g5−g11|<|g8−g9| means that a correlation in the vertical direction is higher than a correlation in the horizontal direction. When the correlation in the vertical direction is higher, the average value of the pixel values of the pixel g5 and the pixel g11, which are G color pixels, located next to the pixel r5 in the up/down direction is determined by the first term (g5+g11)/2 of the right-hand side of the formula (1-2b). By the second term (−r2+2*r5−r8) of the right-hand side of the formula (1-2b), the pixels r2, r5 and r8 of R color aligned in the vertical direction with the position of the pixel r5 in the center are referenced. This term is used for adding, when the change of the pixel values of the pixels r2, r5 and r8 of R color aligned in the vertical direction has non-linearity, such non-linearity to the pixel value determined from the average of the pixel values of the pixel g5 and the pixel g11. Here, λ indicates the proportion of the addition of this term, and a value such as λ=0.25 or λ=0.1 is generally utilized as a fixed value (the same is true for λ in the following description).

On the other hand, the satisfaction of the conditional formula |g5−g11|≥|g8−g9| means that the correlation in the horizontal direction is higher than the correlation in the vertical direction (a case where the correlations in both the vertical and horizontal directions are equal is included). When the correlation in the horizontal direction is higher, the average of the pixel values of the pixel g8 and the pixel g9, which are G color pixels, located next to the pixel r5 in the left/right direction is determined by the first term (g8+g9)/2 of the right-hand side of the formula (1-2c). By the second term (−r4+2*r5−r6) of the right-hand side of the formula (1-2c), the pixels r4, r5 and r6 of R color aligned in the horizontal direction with the position of the pixel r5 in the center are referenced. This term is used for adding, when the change of the pixel values of the pixels r4, r5 and r6 of R color aligned in the horizontal direction has non-linearity, such non-linearity to the pixel value determined from the average of the pixel values of the pixel g8 and the pixel g9.

As described above, when the pixel value of the pixel gg8 of G color is determined, the correlations of the pixel values of the pixels present therearound in the vertical and horizontal directions are compared, and the pixel value is determined by linear interpolation from the adjacent pixels aligned in the direction whose correlation is determined to be higher, with the result that it is possible to more accurately estimate the pixel value. Here, when the nearby pixels of different color components are referenced, and the change of the pixel values with the change of the pixel positions has non-linearity, such non-linearity is added, and thus it is possible to more accurately estimate the pixel value.

With reference to (c) of FIG. 5A, an example will be described where in the partial region image generated by the interpolation processing, the pixel value of the pixel gg11 located in the fourth row from the top and the third column from the left is generated by higher interpolation. In this case, using the pixel values of the pixel b5 located in the fourth row and the third column in the partial region image PRI2 in the reference image shown in (b) of FIG. 5A and the pixels located on the top, bottom, left and right of the pixel b5, the pixel value of the pixel gg11 is determined by the following formula (1-2d) or formula (1-2e).

When |g8−g14|<|g10−g11|, $$gg11=(g8+g14)/2+(-b2+2*b5-b8)*\lambda \quad \text{formula (1-2d)}$$

When |g8−g14|≥|g10−g11|, $$gg11=(g10+g11)/2+(-b4+2*b5-b6)*\lambda \quad \text{formula (1-2e)}$$

Here, the satisfaction of the conditional formula |g8−g14|<|g10−g11| means that a correlation in the vertical direction is higher than a correlation in the horizontal direction. When the correlation in the vertical direction is higher, the average value of the pixel values of the pixel g8 and the pixel g14, which are G color pixels, located next to the pixel b5 in the up/down direction is determined by the first term (g8+g14)/2 of the right-hand side of the formula (1-2d). By the second term (−b2+2*b5−b8) of the right-hand side of the formula (1-2d), the pixels b2, b5 and b8 of B color aligned in the vertical direction with the position of the pixel b5 in the center are referenced. This term is used for adding, when the change of the pixel values of the pixels b2, b5 and b8 of B color aligned in the vertical direction has non-linearity, such non-linearity to the pixel value determined from the average of the pixel values of the pixel g8 and the pixel g14.

On the other hand, the satisfaction of the conditional formula |g8−g14|≥|g10−g11| means that the correlation in the horizontal direction is higher than the correlation in the vertical direction (a case where the correlations in both the vertical and horizontal directions are equal is included). When the correlation in the horizontal direction is higher, the average of the pixel values of the pixel g10 and the pixel g11, which are G color pixels, located next to the pixel b5 in the left/right direction is determined by the first term (g10+g11)/2 of the right-hand side of the formula (1-2e). By the second term (−b4+2*b5−b6) of the right-hand side of the formula (1-2e), the pixels b4, b5 and b6 of B color aligned in the horizontal direction with the position of the pixel b5 in the center are referenced. This term is used for adding, when the change of the pixel values of the pixels b4, b5 and b6 of B color aligned in the horizontal direction has non-linearity, such non-linearity to the pixel value determined from the average of the pixel values of the pixel g10 and the pixel g11.

As described above, when the pixel value of the pixel gg11 of G color is determined, the correlations of the pixel values of the pixels present therearound in the vertical and horizontal directions are compared, and the pixel value is determined by linear interpolation from the adjacent pixels aligned in the direction whose correlation is determined to be higher, with the result that it is possible to more accurately estimate the pixel value. Here, when the nearby pixels of different color components are referenced, and the change of the pixel values with the change of the pixel positions has non-linearity, such non-linearity is added, and thus it is possible to more accurately estimate the pixel value.

With reference to (c) of FIG. 5A, an example will be described where in the partial region image generated by the interpolation processing, the pixel value of a pixel bb5 located in the fourth row from the top and the fourth column from the left is generated by higher interpolation. In the present example, using the pixel values of a pixel g11 located in the fourth row and the fourth column shown in (b) of FIG. 5A and a pixel located in the vicinity of the pixel g11 in the partial region image PRI2 in the reference image, the pixel value of the pixel bb5 is determined by the following formula (1-2f).

$$bb5=[\{b5-(g8+g10+g11+g14)/4\}+\{b6-(g9+g11+g12+g15)/4\}]/2+g11 \quad \text{formula (1-2f)}$$

The pixel b5 and the pixel b6 are pixels that are located on the left and right of the pixel g11. The pixels g8, g14, g10 and g11 are pixels that are located on the top, bottom, left and right of the pixel b5, and the pixels g9, g15, g11 and g12 are pixels that are located on the top, bottom, left and right of the pixel b6. Specifically, {b5−(g8+g10+g11+g14)/4} in the right-hand side of the above formula determines a difference between the pixel value (that is, the value of B color) of the pixel b5 and the estimation value (the average value of pixels g8, g10, g11 and g14) of G color at the position of the pixel b5, that is, a B-G color difference at the position of the pixel b5. Likewise, {b6−(g9+g11+g12+g15)/4} determines a difference between the pixel value (that is, the value of B color) of the pixel b6 and the estimation value (the average value of pixels g9, g11, g12 and g15) of G color at the position of the pixel b6, that is, a B-G color difference at the position of the pixel b6.

When the average value of the B-G color differences at the positions of the pixel b5 and the pixel b6 is determined, it is possible to utilize it as the estimation value of the B-G color difference at the position of the pixel g11. This average value is added to the pixel value of the pixel g11, and thus it is possible to more accurately estimate the pixel value of B color at the position of the pixel g11.

By the interpolation processing of the interpolation method 1 or the interpolation method 2 described above, the interpolation image having the pixel color arrangement pattern of the pattern 1 shown in (c) of FIG. 5A is generated from the partial region image PRI2 having the pixel color arrangement pattern of the pattern 2 shown in (b) of FIG. 5A.

With reference to (d), (e) and (f) in FIG. 5A, an example will be described where the interpolation image is generated from the partial region image PRI2 having the pixel color arrangement pattern of the pattern 3. In the present example, an example will be described with regard to a case where in the pixel color arrangement pattern corresponding to the Bayer arrangement, the pixel values of pixels rr5, gg8, gg11 and bb5 forming a pixel color arrangement unit are generated by interpolation processing. The interpolation processing described below is repeatedly performed on the other arrangement units in the reference image, and thus it is possible to generate the interpolation image. As in the description with reference to (a), (b) and (c) of FIG. 5A, the interpolation method 1 and the interpolation method 2 will be described.

[Pattern 3, Interpolation Method 1]

The interpolation method 1 is performed in the same manner as described in the case where the partial region image PRI2 in the reference image has the pattern 2. Specifically, when the pixel value of the pixel rr5 located in the third row from the top and the third column from the left in the partial region image is generated by linear interpolation processing, the following formula (2-1a) is used. In other words, in the partial region image PRI2 in the reference image shown in (e) of FIG. 5A, the pixel values of the pixel r2 and the pixel r5, which are the pixels of R color next to the pixel g8 located in the third row and the third column in the up/down direction are referenced, and thus the pixel value of the pixel rr5 is derived.

$$rr5=(r2+r5)/2 \quad \text{formula (2-1a)}$$

When the pixel value of the pixel gg8 located in the third row from the top and the fourth column from the left in the partial region image is generated by linear interpolation processing, the following formula (2-1b) is used. In other words, in the partial region image PRI2 in the reference image shown in (e) of FIG. 5A, the pixel values of the pixel g5, the pixel g11, the pixel g8 and the pixel g9, which are the pixels of G color next to the pixel b5 located in the third row and the fourth column in the up/down and the left/right directions, the pixel value of the pixel gg8 is derived.

$$gg8=(g5+g8+g9+g11)/4 \quad \text{formula (2-1b)}$$

When the pixel value of the pixel gg11 located in the fourth row from the top and the third column from the left in the partial region image generated is generated by linear interpolation processing, the following formula (2-1c) is used. In other words, in the partial region image PRI2 in the reference image shown in (e) of FIG. 5A, the pixel values of the pixel g8, the pixel g14, the pixel g10 and the pixel g11, which are the pixels of G color next to the pixel r5 located in the fourth row and the third column in the up/down and the left/right directions are referenced, and thus the pixel value of the pixel gg11 is derived.

$$gg11=(g8+g10+g11+g14)/4 \quad \text{formula (2-1c)}$$

When the pixel value of the pixel bb5 located in the fourth row from the top and the fourth column from the left in the partial region image is generated by linear interpolation processing, the following formula (2-1d) is used. In other words, in the partial region image PRI2 in the reference image shown in (e) of FIG. 5A, the pixel values of the pixel b5 and the pixel b8, which are the pixels of B color next to the pixel g11 located in the fourth row and the fourth column in the up/down direction are referenced, and thus the pixel value of the pixel bb5 is derived.

$$bb5=(b5+b8)/2 \quad \text{formula (2-1d)}$$

[Pattern 3, Interpolation Method 2]

Although the example has been previously described with regard to the case that when the partial region image PRI2 in the reference image has the pattern 2, in order for higher interpolation to be performed, the pixel values of the pixels rr5, gg8, gg11 and bb5 are determined using formula (1-2a), formula (1-2b), formula (1-2c), formula (1-2d) and formula (1-2e), the same processing is performed in the present example where the partial region image PRI2 in the reference image has the pattern 3 shown in (e) of FIG. 5A. Formula (2-2a), formula (2-2b), formula (2-2c), formula (2-2d) and formula (2-2e) corresponding to the formula (1-2a), formula (1-2b), formula (1-2c), formula (1-2d) and formula (1-2e) described above will be shown below. Since the meanings of the individual formulas are the same as those of formula (1-2a), formula (1-2b), formula (1-2d) and formula (1-2e), their description will be omitted.

When in the partial region image generated by the interpolation processing, the pixel value of the pixel rr5 located in the third row from the top and the third column from the left is generated by linear interpolation, the following formula (2-2a) below is used.

$$rr5=[\{r2-(g2+g4+g5+g8)/4\}+\{r5-(g8+g10+g11+g14)/4\}]/2+g8 \quad \text{formula (2-2a)}$$

The following formula (2-2b) or formula (2-2c) below is used so that in the partial region image generated by the interpolation processing, the pixel value of the pixel gg8 located in the third row from the top and the fourth column from the left is generated by linear interpolation.

When |g5−g11|<|g8−g9|, $$gg8=(g5+g11)/2+(-b2+2*b5-b8)*\lambda \quad \text{formula (2-2b)}$$

When |g5−g11|≥|g9|, $$gg8=(g8+g9)/2+(-b4+2*b5-b6)*\lambda \quad \text{formula (2-2c)}$$

The following formula (2-2d) or formula (2-2e) below is used so that in the partial region image generated by the interpolation processing, the pixel value of the pixel gg11 located in the fourth row from the top and the third column from the left is generated by linear interpolation.

When |g8−g14|<|g10−g11|, $$gg11=(g8+g14)/2+(-r2+2*r5-r8)*\lambda \quad \text{formula (2-2d)}$$

When |g8−g14|<|g10−g11|, $$gg11=(g10+g11)/2+(-r4+2*r5-r6)*\lambda \quad \text{formula (2-2e)}$$

When in the partial region image generated by the interpolation processing, the pixel value of the pixel bb5 located in the fourth row from the top and the fourth column from the left is generated by linear interpolation, the following formula (2-2f) below is used.

$$bb5=[\{b5-(g5+g8+g9+g11)/4\}+\{b8-(g11+g14+g15+g17)/4\}]/2+g11 \quad \text{formula (2-2f)}$$

By the interpolation processing of the interpolation method 1 or the interpolation method 2 described above, the interpolation image having the pixel color arrangement pattern of the pattern 1 shown in (f) of FIG. 5A is generated from the partial region image PRI2 having the pixel color arrangement pattern of the pattern 3 shown in (e) of FIG. 5A.

With reference to (h), (i) and (j) in FIG. 5B, an example will be described where the interpolation image is generated from the partial region image PRI2 having the pixel color arrangement pattern of the pattern 4. The present example will be described with regard to a case where in the pixel color arrangement pattern corresponding to the Bayer arrangement, the pixel values of pixels rr5, gg8, gg11 and bb5 forming a pixel color arrangement unit are generated by interpolation processing. The interpolation processing described below is repeatedly performed on the other arrangement units in the reference image, and thus it is possible to generate the interpolation image. As in the description with reference to (a), (b) and (c) of FIG. 5A, the interpolation method 1 and the interpolation method 2 will be described.

[Pattern 4, Interpolation Method 1]

As interpolation processing in the interpolation method 1, the same processing is performed as described in the case where the partial region image PRI2 in the reference image has the pattern 2 or pattern 3. Specifically, when the pixel value of the pixel rr5 located in the third row from the top and the third column from the left in the partial region image is generated by linear interpolation processing, the following formula (3-1a) is used. In other words, in the partial region image PRI2 in the reference image shown in (i) of FIG. 5B, using the pixel values of the pixel r1, the pixel r2, the pixel r4 and the pixel r5, which are the pixels of R color adjacently on the top-left, bottom-left, top-right and bottom-right in a diagonal direction with respect to the pixel b5 located in the third row and the third column, the pixel value of the pixel rr5 is calculated.

$$rr5=(r1+r2+r4+r5)/4 \quad \text{formula (3-1a)}$$

When the pixel value of the pixel gg8 located in the third row from the top and the fourth column from the left in the partial region image is generated by linear interpolation processing, the following formula (3-1b) is used. In other words, in the partial region image PRI2 in the reference image shown in (i) of FIG. 5B, the pixel located in the third row and the fourth column is the pixel g8 of G color, which has the same color as the pixel gg8. Thus, the pixel value of the pixel g8 is used as the pixel value of the pixel gg8 without being processed.

$$gg8=g8 \quad \text{formula (3-1b)}$$

When the pixel value of the pixel gg11 located in the fourth row from the top and the third column from the left in the partial region image is generated by linear interpolation processing, the following formula (3-1c) is used. In other words, in the partial region image PRI2 in the reference image shown in (i) of FIG. 5B, the pixel located in the fourth row and the third column is the pixel g11 of G color, which has the same color as the pixel gg11. Thus, the pixel value of the pixel g11 is used as the pixel value of the pixel gg11 without being processed.

$$gg11=g11 \quad \text{formula (3-1c)}$$

When the pixel value of the pixel bb5 located in the fourth row from the top and the fourth column from the left in the partial region image is generated by linear interpolation processing, the following formula (3-1d) is used. In other words, in the partial region image PRI2 in the reference image shown in (i) of FIG. 5B, the pixel values of the pixel b5, the pixel b6, the pixel b8 and the pixel b9, which are the pixels of B color adjacently on the top-left, bottom-left, top-right and bottom-right in a diagonal direction with respect to the pixel r5 located in the fourth row and the fourth column, are referenced. Thus, the pixel value of the pixel bb5 is calculated by the following formula (3-1d).

$$bb5=(b5+b6+b8+b9)/4 \quad \text{formula (3-1d)}$$

[Pattern 4, Interpolation Method 2]

Although the example has been previously described with regard to the case that when the partial region image PRI2 has the pattern 2, in order for higher interpolation to be performed, the pixel values of the pixels rr5, gg8, gg11 and bb5 are determined using formula (1-2a), formula (1-2b), formula (1-2c), formula (1-2d) and formula (1-2e), the same processing is performed in the present example where the partial region image PRI2 in the reference image has the pattern 4. Formula (3-2a), formula (3-2b), formula (3-2c) and formula (3-2d) corresponding to the pattern 4 will be shown below.

In the partial region image generated by the interpolation processing, the pixel value of the pixel rr5 located in the third row from the top and the third column from the left is generated by the following formula (3-2a) below.

$$rr5=[\{r1-(g1+g4+g5+g7)/4\}+\{r2-(g2+g5+g6+g8)/4\}+\{r4-(g7+g10+g11+g13)/4\}+\{r5-(g8+g11+g12+g14)/4\}]/4+(g5+g7+g8+g11)/4 \quad \text{formula (3-2a)}$$

In the above formula (3-2a), {r1−(g1+g4+g5+g7)/4}, {r2−(g2+g5+g6+g8)/4}, {r4−(g7+g10+g11+g13)/4} and {r5−(g8+g11+g12+g14)/4} in the right-hand side will be described. In the partial region image PRI2 in the reference image shown in (i) of FIG. 5B, the pixels r1, r2, r4 and r5 are present adjacently on the top-left, bottom-left, top-right and bottom-right in the diagonal direction with respect to the pixel b5 located in the third row and the third column. In the above four formulas, the pixel values of G color components corresponding to the pixel positions of these four R color pixels are determined from the G color pixel values around each R color pixel by interpolation, and the R-G color difference is calculated. In (g5+g7+g8+g11)/4 in the above formula (3-2a), the G color pixel value at the position of the pixel b5 is determined by interpolation from the values of four G color pixels g5, g7, g8 and g11 around the pixel b5. Then, the average of the four R-G color differences described above is added to the G color pixel value at the position of the pixel b5, and thus the pixel value of R color at the position of the pixel b5 is obtained.

When the pixel value of the pixel gg8 located in the third row from the top and the fourth column from the left in the partial region image generated by the interpolation processing is determined by the following formula (3-2b). In other words, in the partial region image PRI2 in the reference image shown in (i) of FIG. 5B, the pixel located in the third row and the fourth column is the pixel g8 of G color, which has the same color as the pixel gg8. Thus, as shown in following formula (3-2b), the pixel value of the pixel g8 is used as the pixel value of the pixel gg8 without being processed.

$$gg8=g8 \qquad \text{formula (3-2b)}$$

When the pixel value of the pixel gg11 located in the fourth row from the top and the third column from the left in the partial region image generated by the interpolation processing is determined using the following formula (3-2c). In other words, in the partial region image PRI2 in the reference image shown in (i) of FIG. 5B, the pixel located in the fourth row and the third column is the pixel g11 of G color, which has the same color as the pixel gg11. Thus, as shown in following formula (3-2c), the pixel value of the pixel g11 is used as the pixel value of the pixel gg11 without being processed.

$$gg11=g11 \qquad \text{formula (3-2c)}$$

In the partial region image PRI2 in the reference image shown in (i) of FIG. 5B, the pixel value of the pixel bb5 located in the fourth row and the fourth column is determined using the following formula (3-2d) below.

$$bb5=\{[b5-(g5+g7+g8+g11)/4]+\{b6-(g6+g8+g9+g12)/4\}+\{b8-(g11+g13+g14+g17)/4\}+\{b9-(g12+g14+g15+g18)/4\}]/4+(g8+g11+g12+g14)/4 \qquad \text{formula (3-2d)}$$

In the above formula (3-2d), $\{b5-(g5+g7+g8+g11)/4\}$, $\{b6-(g6+g8+g9+g12)/4\}$, $\{b8-(g11+g13+g14+g17)/4\}$ and $\{b9-(g12+g14+g15+g18)/4\}$ in the right-hand side will be described. In the partial region image PRI2 in the reference image shown in (i) of FIG. 5B, the pixels b5, b6, b8 and b9 are present adjacently on the top-left, bottom-left, top-right and bottom-right in the diagonal direction with respect to the pixel r5 located in the fourth row and the fourth column. In the above four formulas, the pixel values of G color components corresponding to the pixel positions of these four B color pixels are determined from the G color pixel values around the B color pixel by interpolation, and the B-G color difference is calculated. In $(g8+g11+g12+g14)/4$ in the above formula (3-2d), the G color pixel value at the position of the pixel r5 is determined by interpolation from the values of G color pixels g8, g11, g12 and g14 around the pixel r5. Then, the average of the four B-G color differences described above is added to the G color pixel value at the position of the pixel r5, and thus the pixel value of B color at the position of the pixel r5 is obtained.

By the interpolation processing described above, it is possible to generate the interpolation image (partial region image) of the same pixel color arrangement pattern as that of the partial region image PRI1 in the standard image regardless of the pixel color arrangement pattern of the partial region image PRI2 extracted from the reference image as the image at the position corresponding to the partial region image PRI1 in the standard image. Hence, it is possible to more desirably combine the standard image and the interpolation image. When the pixel color arrangement of the partial region image PRI2 in the reference image is the pattern 1, which is the same as that of the partial region image PRI1 in the standard image, it is not necessary to perform the interpolation processing corresponding to the patterns 2 to 4 described above, with the result that it is possible to utilize the pixel value of the reference image without it being processed. In other words, it is possible to omit the processing for generating the pixel value by interpolation.

Although in the above description, the examples have been shown where the interpolation processing is performed by the interpolation method 1 as a simpler method and the interpolation processing is performed by the interpolation method 2 as a higher method, it is possible to utilize other interpolation methods. Specifically, when in the CFA image, the pixel value of a certain pixel at a given pixel position is estimated, it is possible to utilize an arbitrary interpolation method other than those illustrated above as long as the arbitrary interpolation method can generate the pixel value of a color different from the original pixel color of the certain pixel at the given pixel position.

Figure 6:
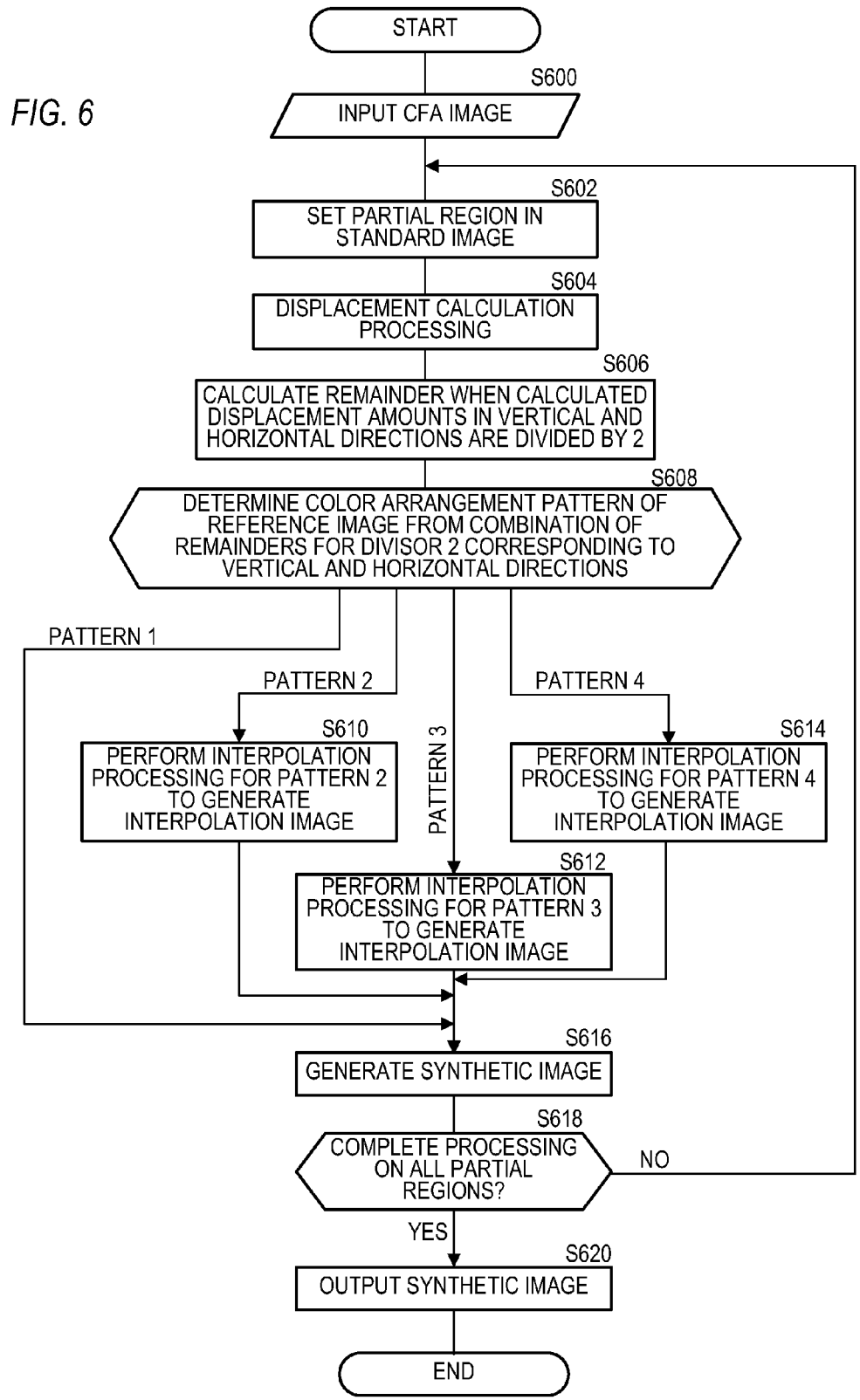
FIG. 6 is a flowchart illustrating a synthesis processing procedure of a plurality of color filter array images performed in an image processing portion.

FIG. 6 is a flowchart illustrating the processing procedure of CFA image synthesis processing performed by the image processing portion 100. In a case where the image processing portion 100 is incorporated in, for example, a digital camera, when a shooting operation is performed by the digital camera, and n CFA images are obtained by shooing the same subject, the processing shown in FIG. 6 is performed. Alternatively, in a case where continuous shooting is performed to obtain n CFA images, the processing shown in FIG. 6 may be started before the completion of a series of continuous shooting operations. In the following description, it is assumed that the processing of FIG. 6 is started when two Bayer CFA images are obtained by shooting the same subject.

In S600, the image processing portion 100 inputs two CFA images. It is assumed that one of these CFA images is the standard image, and the other is the reference image. It is possible to arbitrarily set the standard image to either of the CFA image obtained by the first shooting operation and the CFA image obtained by the subsequent shooting operation.

In S602, the image processing portion 100 sets a partial region in the standard image. This partial region can be set by an arbitrary division method, and the entire image can set as one region. In the present example, as described with reference to FIGS. 4, 5A and 5B, a rectangular region formed with 36 pixels consisting of 6 pixels in the vertical direction and 6 pixels in the horizontal direction is set. In the standard image, a rectangular window whose size is 6 pixels in each of the vertical and horizontal directions is sequentially moved, and processing described below is repeatedly performed while the position of the partial region is being changed, with the result that the synthesis processing on the entire screen is performed.

In S604, the image processing portion 100 uses, as a template, the image of the partial region set in S602, that is, the partial region image PRI1, and searches for a partial region having a high degree of matching in the reference image. Then, as described with reference to FIGS. 3 and 4, the displacement amounts dx and dy in the vertical direction and the horizontal direction are calculated with the resolution of one pixel.

In S606, the image processing portion 100 calculates, for each of the displacement amounts dx and dy calculated in S604 in the vertical direction and the horizontal direction, a remainder (remainder for divisor 2) obtained by division by 2 is calculated. As the result of the calculation, the combination of (the displacement amount in the horizontal direction dx, the displacement amount in the vertical direction dy) expressed in the remainder for divisor 2 is (0, 0), (1, 0), (0, 1) or (1, 1).

In S608, the image processing portion 100 determines, from the combinations (0, 0), (1, 0), (0, 1) and (1, 1) in the remainder for divisor 2 calculated in S606, the arrangement pattern of the pixel colors in the partial region image PRI2 in the reference image corresponding to the partial region image PRI1 set in the standard image. When the combination expressed in the remainder for divisor 2 is (0, 0), the arrangement pattern is determined to be the pattern 1, when the combination in the remainder for divisor 2 is (1, 0), the arrangement pattern is determined to be the pattern 2, when the combination in the remainder for divisor 2 is (0, 1), the arrangement pattern is determined to be the pattern 3, and when the combination in the remainder for divisor 2 is (1, 1), the arrangement pattern is determined to be the pattern 4.

When the arrangement pattern is determined to be the pattern 1 in S608, since the partial region images PRI1 and PRI2 have the arrangement pattern of the same pixel colors, it is not necessary to perform interpolation processing on the partial region image PRI2, with the result that it is possible to utilize the individual pixel values within the partial region image PRI2 without them being processed. On the other hand, when the arrangement pattern is determined to be any one of the pattern 2, the pattern 3 and the pattern 4, the interpolation processing corresponding to the determined pattern is performed in any of S610, S612 and S614 to generate an interpolation image (interpolation pixel value). As the interpolation processing performed in S610, S612 and S614, any of the interpolation method 1 and the interpolation method 2 described previously can also be used. The interpolation processing may be performed by an interpolation method other than the interpolation method 1 and the interpolation method 2. Here, the user may select an interpolation method from a plurality of previously prepared interpolation methods.

The partial region image PRI1 in the standard image data and the interpolation image data (the individual pixel values of the partial region image PRI2 in the pattern 1) generated as described above are combined and synthesized in S616, and thus a synthetic image (combination image) is generated. The synthetic image generated here is the CFA image of the same number of pixels as the partial region image PRI1. Although various methods can be performed as the synthesis processing, an example where the combination is performed by addition will be described here. When the combination is performed by addition, for example, the addition combination can be performed in a predetermined mixing ratio of M to N for each pixel between the partial region image PRI1 and the interpolation image. As a specific example, when it is assumed that P1 is the pixel value of the pixel in the partial region image PRI1 of the standard image data, P2 is the pixel value of the pixel in the interpolation image corresponding to the present pixel in the partial region image PRI1 and P3 is the pixel value after the combination, it is possible to perform the addition combination using the following formula (4).

$$P3 = (M \times P1 + N \times P2)/(M+N) \quad \text{formula (4)}$$

In formula (4) above, M and N can be arbitrary real numbers. In an example of simple addition combination, it is assumed that M=1 and N=1, and thus the sum of the pixel values P1 and P2 can be divided by 2. It is assumed that either of M and N is a negative value, and thus it is also possible to obtain a difference between both pixel values. It is also possible to assume that any one of M and N is zero. In other words, it is also possible to select any one of the pixel values P1 and P2 as the pixel value P3 after the combination.

In S618, the image processing portion 100 determines whether or not processing corresponding to all the partial regions is completed. While the determination in S618 is being negative, the processing from S602 to S616 described above is repeatedly performed. When the processing in all the partial regions is completed, the determination in S618 becomes positive, and the process proceeds to S620.

The image processing portion 100 outputs the synthetic image in S620, and completes a series of processing steps.

The input of a plurality of CFA images, the calculation of the displacement amount, the interpolation and the image synthesis processing performed by the image processing portion 100 have been described above with reference to the flowchart of FIG. 6. Although in FIG. 6, the case where the CFA image is the Bayer CFA image formed with the pixel color arrangement units of 2 pixels in each of the vertical and horizontal directions has been described as an example, the present invention is not limited to this example. Specifically, when the arrangement unit of the pixel colors of the CFA image consists of r pixels in the vertical direction and c pixels in the horizontal direction, in S606, the remainder obtained by dividing the displacement amount in the horizontal direction dx by c and the remainder obtained by dividing the displacement amount in the vertical direction dy by r are calculated. In S608, the arrangement pattern of the pixel colors of the partial region image PRI2 in the reference image is determined from the combination of the remainders corresponding to the vertical and horizontal directions. When the arrangement unit of the pixel colors consists of r pixels in the vertical direction and c pixels in the horizontal direction, (r×c) combinations of the remainders are present. In S608, the color arrangement pattern of the reference image is determined to be any one of the (r×c) color arrangement patterns. Then, the interpolation processing corresponding to the determination result in S608 is performed. Here, when the color arrangement pattern is determined to be the pattern 1 corresponding to the case where the combination of the remainders in the vertical and horizontal directions is (0, 0), it is possible to omit the interpolation processing.

Although in the above description with reference to FIGS. 5A, 5B and 6, the interpolation image is generated by the interpolation method corresponding to the color arrangement pattern of the reference image, and then the standard image and the interpolation image are combined, as will be described below, it is possible to calculate an interpolation pixel value in pixel order and perform the synthesis processing. In other words, when the color arrangement pattern of the reference image is determined in S608, it is determined whether the combination is performed using the pixel values of the reference image without them being processed (the case of the pattern 1) or the pixel values generated by performing the interpolation processing are combined with the pixel values corresponding to the standard image (the cases of the pattern 2, the pattern 3 and the pattern 4). When it is necessary to perform the interpolation processing on the color arrangement pattern of the reference image with any of the patterns 2 to 4, it is possible to perform the synthesis processing while calculating, in pixel order, the pixel values rr1, gg1, . . . , gg18 and bb9 corresponding to the individual pixels (R1, G1, R2, . . . , G18 and B9) in the partial region image PRI1 of the standard image. It is possible to arbitrarily set the order of processing and a scanning direction when the processing is performed in pixel order.

Although in the above description with reference to FIG. 6, the example has been discussed where the synthesis processing is performed on two CFA images, it is also possible to perform the synthesis processing on three or more CFA images. When three or more CFA images are combined, it is possible to perform the synthesis processing with a method that will be described below with reference to FIGS. 7 and 8 or the like.

Figure 7:
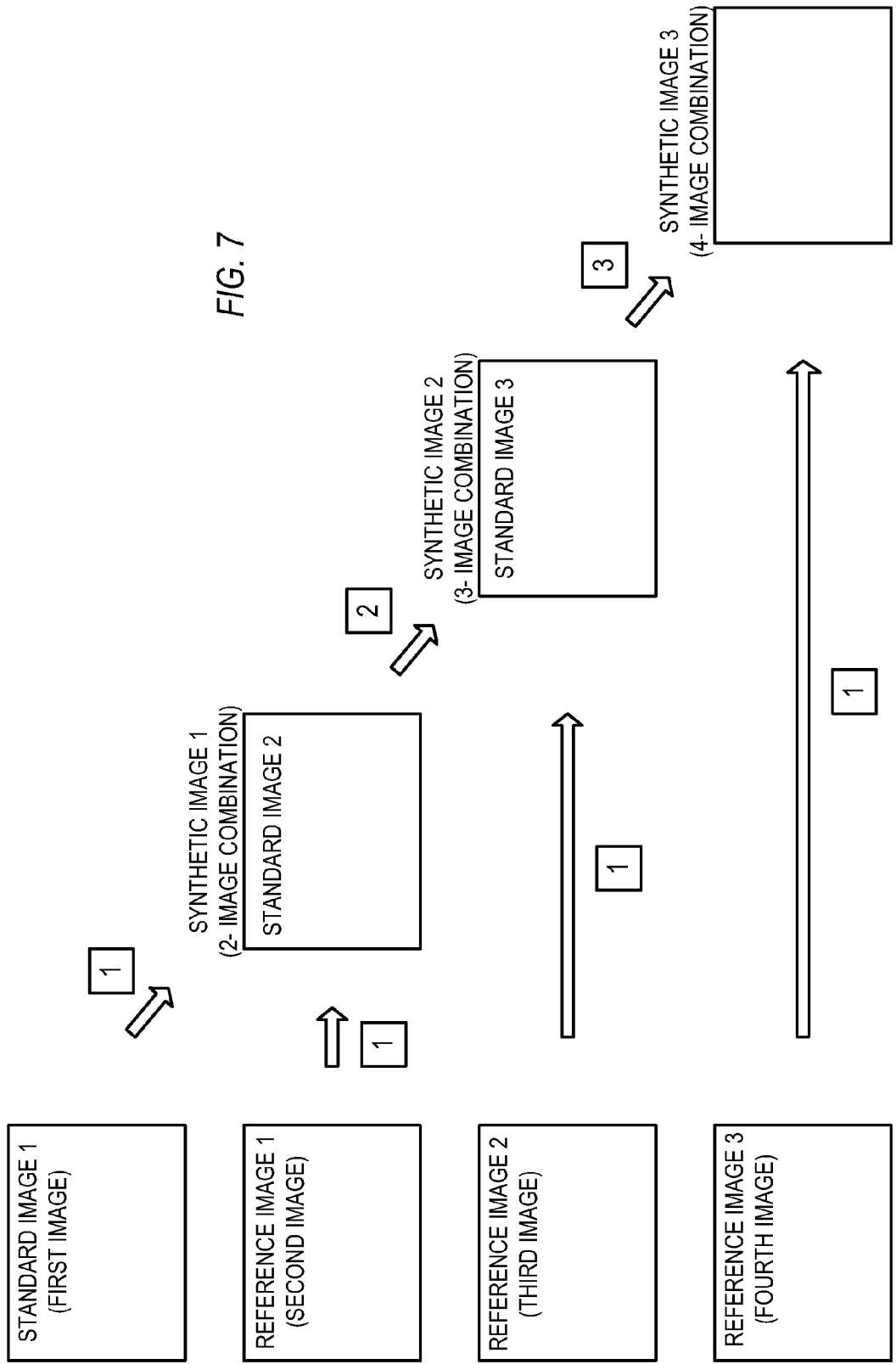
FIG. 7 is a diagram illustrating an example of a processing procedure when three or more color filter array images are combined.

In the synthesis processing shown in FIG. 7, with the assumption that among a plurality of CFA images, one of the selected two CFA images is the standard image, and the other is the reference image, processing for the calculation of the displacement amount, the interpolation and the image combination is performed to form a synthetic image 1. In the example of FIG. 7, the first image is set at a standard image 1, and the second image is set at a reference image 1. Then, with the assumption that the generated synthetic image 1 is a new standard image and one of the unprocessed CFA images is a new reference image, the processing for the calculation of the displacement amount, the interpolation and the image combination is performed to form a synthetic image. In the example of FIG. 7, with the assumption that the third image is set at a reference image 2, and the synthetic image 1 is set at a standard image 2, a synthetic image 2 is generated. These types of processing are repeatedly performed according to the number of CFA images input, n CFA images are reduced so as to be (n−1) images and are then reduced so as to be (n−2) images and one synthetic image is finally generated. In the example of FIG. 7, a synthetic image 3 is a final synthetic image that can be obtained.

In FIG. 7, numbers enclosed by rectangular frames are shown, and these indicate examples of the combination ratio set when two images are combined. In other words, this means that when the standard image 1 and the reference image 1 are combined to generate the synthetic image 1, the combination ratio between the standard image 1 and the reference image 1 is set at 1:1. When the standard image 2 and the reference image 2 are combined to generate the synthetic image 2, the combination ratio between the standard image 2 and the reference image 2 is set at 2:1. In other words, the combination ratio of the standard image 2 obtained by combining two images is set at twice the combination ratio of the reference image 1. When the standard image 3 and the reference image 3 are combined to generate the synthetic image 3, the combination ratio between the standard image 3 and the reference image 3 is set at 3:1. In other words, the combination ratio of the standard image 3 obtained by combining three images is set at three times the combination ratio of the reference image 3. As described above, the combination ratio between the standard image and the reference image is changed according to how many images are combined to obtain the standard image, and thus it is possible to reduce the relative increase in the degree of influence of a reference image that is combined later, as compared with a case where the combination is performed at a constant combination ratio.

It is also possible to perform the synthesis processing in a manner that will be described below. For example, when four CFA images are input, the first input image is set at the standard image 1, the second input image is set at the reference image 1 and the synthetic image 1 is obtained from these images. Moreover, the third input image is set at the standard image 2, the fourth input image is set at the reference image 2 and the synthetic image 2 is obtained from these images. Then, the synthetic image 1 is set at the standard image 3, and the synthetic image 2 is set at the reference image 3, with the result that the obtained synthetic image may be set at the finally obtained synthetic image. In this case, the combination ratio of each image combined is constantly set at 1:1, and thus it is possible to make uniform the degree of influence of each input image in the finally obtained synthetic image. Needless to say, a different combination ratio may be set for each input image.

Figure 8:
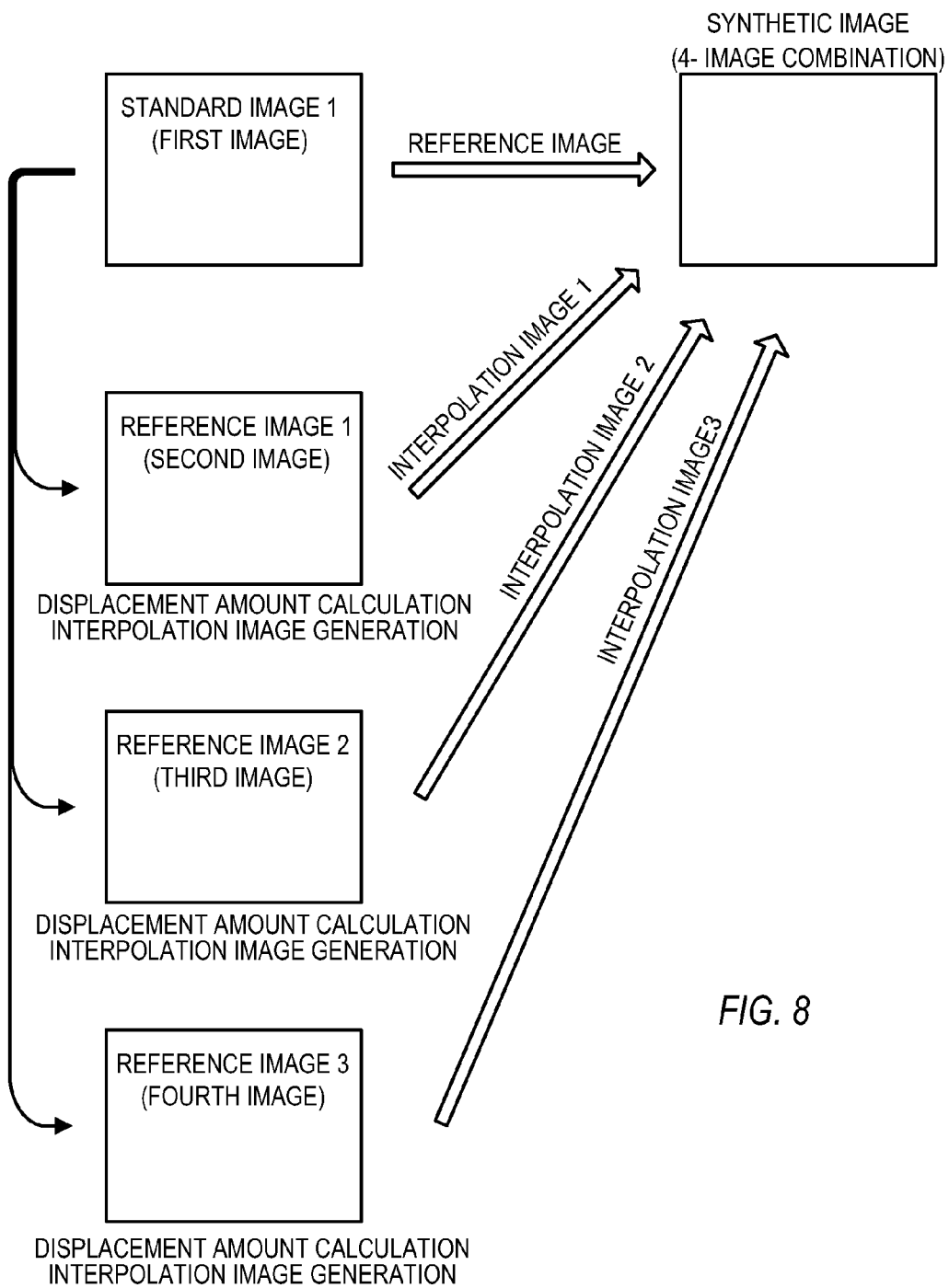
FIG. 8 is a diagram illustrating another example of the processing procedure when three or more color filter array images are combined.

The procedure of synthesis processing different from that shown in FIG. 7 will be described with reference to FIG. 8. In the example of the synthesis processing shown in FIG. 8, among n CFA images input, the first image is set at the standard image, and the remaining (n−1) CFA images are set at the reference image 1, the reference image 2, . . . and the reference image n−1. Then, processing for the calculation of the displacement amount and the generation of the interpolation image is performed according to the individual combinations between the standard image and the reference image 1, the standard image and the reference image 2, . . . and the standard image and the reference image n−1. Consequently, (n−1) interpolation images are generated. In the example of FIG. 8, three interpolation images, that is, the interpolation image 1, the interpolation image 2 and the interpolation image 3, are generated from four CFA images input. Then, each of the generated interpolation images and the standard image are combined to generate a synthetic image. The combination ratio between each interpolation image and the standard image can be arbitrarily set.

Although in the above description with reference to FIGS. 7 and 8, the example has been discussed where among a plurality of CFA images input, the first CFA images is set at the standard image, any of the CFA images input can be set at the standard image. Further, the combination of the CFA images that are the targets to be subjected to the synthesis processing can be arbitrarily set.

A processing load when the calculation of the displacement amount, the interpolation processing and the synthesis processing are performed in the procedure described above is reduced as compared with a processing load when image data is generated by demosaicing processing and full-colorization, and the calculation of the displacement amount and the synthesis processing are performed. Specifically, since the original CFA image is set at one sheet of image, and the image generated by the interpolation processing is set at another sheet of image, processing for change into two sheets is sufficient. In other words, only about half the amount of processing is needed as compared with a case where the CFA image of the Bayer arrangement is subjected to demosaicing processing to generate image data of full-color undergoing change into three sheets of color plain of each of R, G and B. Although in a case where demosaicing processing is performed halfway through, image data of two images is additionally generated, in the present embodiment, only image data of one image is additionally generated. Moreover, in the interpolation processing described above, only when the pixel color of the pixel in the partial region image PRI2 extracted from the reference image is different from that of the corresponding pixel in the partial region image PRI1 of the standard image, the interpolation processing is performed. In other words, since the interpolation processing is performed only when it is needed, it is possible to further reduce the processing load.

Not only it is possible to reduce the processing load as described above but also it is possible to perform the synthesis processing with the same accuracy as in the case where the combination is performed using the image after being subjected to demosaicing processing, since the displacement amount is determined with the accuracy of one pixel to perform the interpolation processing and the synthesis processing. Moreover, since it is possible to store, as RAW image data, the image data obtained by performing the synthesis processing, it is possible to reduce the decrease in the image quality caused when image processing such as retouch is performed later. In addition, in the RAW image data, the amount of information exceeding the bit depth of 8 bits can be maintained as a pixel value corresponding to each pixel, and thus, it is also possible to reduce the decrease in the image quality caused when retouch or the like is performed later.

The image processing portion 100 described above can be included into a digital camera, a mobile telephone incorporating a camera, a portable information terminal incorporating a camera, or the like. Alternatively, the function of the image processing portion 100 may be implemented such that an image processing program recorded in a recording medium is read and executed by the CPU of a computer. Its example will be described below.

Figure 9:
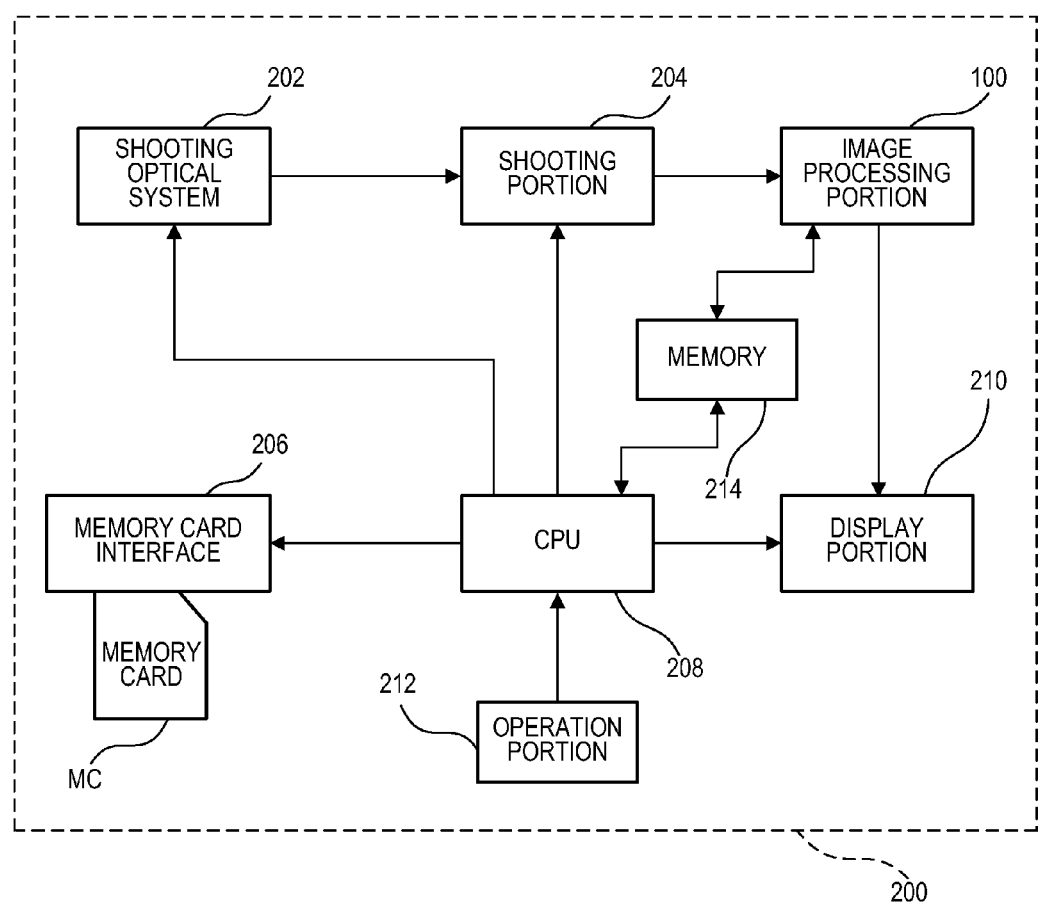
FIG. 9 is a block diagram illustrating an example where the image processing portion is included in a digital camera.

FIG. 9 is a block diagram illustrating a schematic internal configuration of a digital camera 200 including the image processing portion 100 described above. The digital camera 200 may be either a still camera or a movie camera. It may also be a camera that is incorporated in a mobile telephone, a portable information terminal or the like. When the digital camera 200 is either a still camera or a movie camera, a shooting lens may be a stationary type or may be configured such that it can be replaced.

The digital camera 200 includes a shooting optical system 202, a shooting portion 204, the image processing portion 100, a memory card interface 206, a CPU 208, a display portion 210, an operation portion 212 and a memory 214.

The shooting optical system 202 forms a subject image on the light reception area of the shooting portion 204. The shooting optical system 202 may be an optical system of single focus or an optical system of variable focal length.

The shooting portion 204 includes a shutter, an imaging device, an analog•front end and the like. The light of the subject passing through the shooting optical system 202 enters the imaging device while the shutter is being opened. The subject image formed on the light reception area of the imaging device is photoelectrically converted to form an image signal. When the imaging device has the function of an electronic shutter that can electrically control the exposure time (photoelectric conversion time), the shutter may not be included. On the light reception surface of the imaging device, an on-chip color filter is arranged. The shooting portion 204 performs a plurality of exposure operations on the same subject, and thereby can generate a plurality of CFA images. Alternatively, the digital camera 200 may be configured such that a plurality of sets of shooting optical system 202 and shooting portion 204 are included, a plurality of shooting operations are performed substantially simultaneously and thus a plurality of CFA image data can be generated. Here, for example, different shutter times are set according to the acquisition of each piece of CFA image data, and thus it is possible to obtain a plurality of CFA image data of different exposure amounts. By combining these pieces of image data, it is possible to obtain a so-called HDR synthetic image.

The operation portion 212 includes one type or a plurality of types of a push switch, a slide switch, a dial switch, a touch panel and the like, and can receive the operation of the user. The display portion 210 includes a TFT liquid crystal display panel and a backlight device, or a self-luminous type display element such as an organic EL display element, and can display information such as images or characters.

The memory 214 includes a flash memory, a RAM and the like. The flash memory stores a control program (firmware) that is executed by the CPU 208, adjustment parameters, information that is needed to be retained even in a state where the power of the digital camera 200 is off and the like. The RAM can be accessed by both the CPU 208 and the image processing portion 100, and functions as the work area of the CPU 208 and the image processing portion 100. The CPU 208 interprets and executes the firmware transferred from the flash memory to the RAM to comprehensively control the operation of the digital camera 200.

The memory card interface 206 can write information to a memory card MC that is removably fitted, and can read information from the memory card MC.

The user switches on the power of the digital camera 200, and operates the operation portion 212 to switch the digital camera 200 to a shooting mode. When the user further operates the operation portion 212 to set the operation mode at, for example, an HDR shooting mode and performs a release operation on the digital camera 200 toward the subject, a series of CFA image data are generated and input to the image processing portion 100. As described previously, the image processing portion 100 performs the synthesis processing on the CFA images to generate synthetic image data. This synthetic image data is also the CFA image data. This synthetic image data is reversibly compressed, metadata such as shooting information is added and thus it is possible to record it as a RAW image file in the memory card MC. It is also possible to generate full-color image data by performing demosaicing processing on the synthetic image data. Based on the full-color image data described above, it is possible to display an image on the display portion 210. Furthermore, the full-color image data is irreversibly compressed by JPEG or the like, metadata is added and thus it is also possible to record it as a JPEG image file in the memory card MC.

Alternatively, without the synthesis processing being performed by the image processing portion 100 on the CFA image data generated by the shooting portion 204, it is also possible to record it in the memory card MC. In this case, when the digital camera 200 is switched to a reproduction mode, the CFA image data are read from the memory card MC by the memory 214. Then, after the synthesis processing is performed by the image processing portion 100, demosaicing processing is performed to achieve full-colorization, and thus it is possible to display an image on the display portion 210. The series of CFA image data recorded in the memory card MC are transferred to another device such as a computer or a video recorder through the memory card MC or an interface cable, and thus it is also possible to perform the synthesis processing within the computer, the video recorder or the like.

Figure 10:
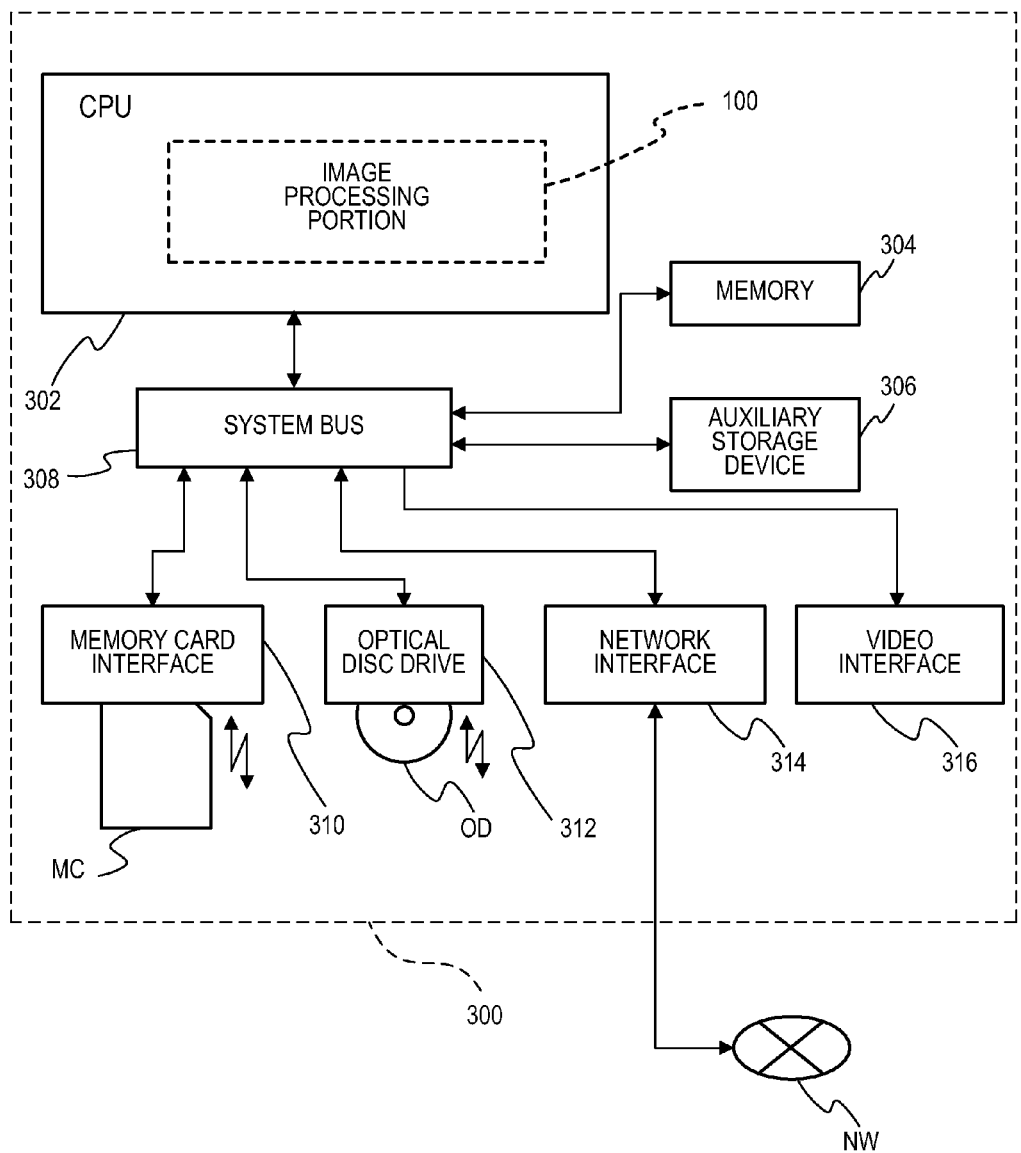
FIG. 10 is a block diagram illustrating a schematic internal configuration of a computer, and a diagram illustrating an example where an image processing program is executed by the computer to realize the image processing portion.

FIG. 10 is a block diagram illustrating an example where the image processing program is executed by the CPU 302 of an information processing device 300 to realize the image processing portion 100. The information processing device 300 includes the CPU 302, a memory 304, an auxiliary storage device 306 and a system bus 308. The information processing device 300 also includes a memory card interface 310, an optical disc drive 312, a network interface 314 and a video interface 316. The information processing device 300 may include a wired or wireless communication interface as necessary.

The memory 304 is formed with an SDRAM or the like, has a relatively high access speed and is used as a work area for the execution of a program by the CPU 302. The auxiliary storage device 306 includes a hard disk drive, an SSD (solid state drive) or the like, and can store the program executed by the CPU 302, an image file and the like.

The memory card interface 310 can read information from the fitted memory card MC and write information to the memory card MC. The memory card MC is a storage medium that can store an image file, a program file and the like, and can also be fitted to the digital camera 200.

The optical disc drive 312 can read an image file, a program file and the like from a fitted optical disc OD. The optical disc drive 312 may be configured to write an image file, various types of information and the like in the optical disc OD.

The network interface 314 can be connected to a network NW in a wired or wireless form. The network interface 314 can output information to a server or the like connected to the network NW and input information from the server or the like.

The video interface 316 can connect a display device such as a flat panel display like a color liquid crystal display device or a CRT. On the connected display device, information such as characters, images and the like are displayed. The memory 304, the auxiliary storage device 306, the memory card interface 310, the optical disc drive 312, the network interface 314 and the video interface 316 described above are connected to the CPU 302 through the system bus 308.

The image processing program that is read from a computer readable recording device (or a non-transitory computer readable storage medium) such as the auxiliary storage device 306, the memory card MC or the optical disc OD and that is loaded to the memory 304 is executed by the CPU 302, and thus the image processing portion 100 is realized. The image processing program is encoded and recorded in this recording device in a computer readable format. The image processing portion 100 reads a series of CFA images from any one of the auxiliary storage device 306, the memory card MC, the optical disc OD and the like, and thereby can perform the synthesis processing described previously. The CFA image obtained by the synthesis processing can be recorded, as the RAW image data, in any one of the auxiliary storage device 306, the memory card MC, the optical disc OD and the like. Demosaicing processing is performed on the CFA image obtained by the synthesis processing, and thus it is also possible to generate full-color image data. The generated full-color image data is further processed, image data for display or image data for recording is generated and processing for display or recording is performed.

The present invention can be applied to products such as a broadcast stationary camera, an ENG camera, a consumer handy camera and a digital camera. The present invention can also be applied to an image edition device, a video recorder and the like. Furthermore, the present invention can also be applied to an image processing program for processing a moving image and a still image.

While embodiments of the present invention have been described, the present invention may be variously changed or modified without departing from the scope or spirit of the present invention. Those skilled in the art would appreciate that such changes and modifications are incorporated into the scope of the invention and equivalents thereof as apparent from the appended claims.

What is claimed is:

1. An image processing device that combines a plurality of color filter array images obtained by shooting a same subject, the image processing device comprising:
    a displacement amount calculation portion configured to calculate a displacement amount of a reference image with respect to a standard image, wherein among the color filter array images, one image is the standard image, and an image different from the one image is the reference image; and
    a synthesis processing portion configured to perform synthesis processing based on the displacement amount calculated by the displacement amount calculation portion, according to pixel values of a standard image pixel and a reference image pixel that are corresponding pixels at corresponding pixel positions between the standard image and the reference image, so as to generate a synthetic color filter array image,
    wherein, when colors of the corresponding pixels differ between the standard image pixel and the reference image pixel, the synthesis processing portion generates, from the reference image, a pixel value of a same color as a color of the standard image pixel by interpolation processing, and performs the synthesis processing according to the pixel value generated by the interpolation processing and the pixel value of the standard image pixel.

2. The image processing device according to claim 1, wherein the color filter array images include n (n: an integer of 3 or more) color filter array images, and
    the synthesis processing portion is configured to repeatedly perform, (n−1) times, the synthesis processing that generates one synthetic color filter array image from two color filter array images, and in a second and subsequent rounds of the synthesis processing, a synthetic color filter array image generated by a round of the synthesis processing previously performed is set at the standard image.

3. The image processing device according to claim 1, wherein the color filter array image is output from an imaging device including a color filter array having a pixel color arrangement unit consisting of r pixels in a vertical direction and c pixels in a horizontal direction (each of r and c is an arbitrary positive integer),
    the displacement amount calculation portion calculates, as the displacement amount, a displacement pixel number in the vertical direction and a displacement pixel number in the horizontal direction and
    the synthesis processing portion uses, when a pixel value is generated by the interpolation processing, an interpolation method selected based on a combination of a remainder obtained when the displacement pixel number in the vertical direction is divided by the integer r and a remainder obtained when the displacement pixel number in the horizontal direction is divided by the integer c.

4. The image processing device according to claim 1, further comprising:
    a demosaicing processing portion configured to perform demosaicing processing on the synthetic color filter array image to generate a full-color image.

5. An image processing method of combining a plurality of color filter array images obtained by shooting a same subject, the image processing method comprising:
    a displacement amount calculation step of calculating a displacement amount of a reference image with respect to a standard image, wherein among the color filter array images, one image is the standard image, and an image different from the one image is the reference image; and
    a synthesis processing step of performing synthesis processing based on the displacement amount calculated by the displacement amount calculation step, according to pixel values of a standard image pixel and a reference image pixel that are corresponding pixels at corresponding pixel positions between the standard image and the reference image, so as to generate a synthetic color filter array image,
    wherein, in the synthesis processing step, when colors of the corresponding pixels differ between the standard image pixel and the reference image pixel, a pixel value of a same color as a color of the standard image pixel is generated from the reference image by interpolation processing, and the synthesis processing is performed according to the pixel value generated by the interpolation processing and the pixel value of the standard image pixel.

6. A non-transitory computer readable storage medium that stores an image processing program of combining a plurality of color filter array images obtained by shooting a same subject,
   wherein the image processing program controls a computer to execute:
   a displacement amount calculation step of calculating a displacement amount of a reference image with respect to a standard image, wherein among the color filter array images, one image is the standard image, and an image different from the one image is the reference image; and
   a synthesis processing step of performing synthesis processing based on the displacement amount calculated by the displacement amount calculation step, according to pixel values of a standard image pixel and a reference image pixel that are corresponding pixels at corresponding pixel positions between the standard image and the reference image, so as to generate a synthetic color filter array image,
   wherein, in the synthesis processing step, when colors of the corresponding pixels differ between the standard image pixel and the reference image pixel, a pixel value of a same color as a color of the standard image pixel is generated from the reference image by interpolation processing, and the synthesis processing is performed according to the pixel value generated by the interpolation processing and the pixel value of the standard image pixel.

* * * * *